US006388399B1

(12) United States Patent
Eckel et al.

(10) Patent No.: US 6,388,399 B1
(45) Date of Patent: May 14, 2002

(54) NETWORK BASED ELECTRICAL CONTROL SYSTEM WITH DISTRIBUTED SENSING AND CONTROL

(75) Inventors: David P. Eckel, Eaton's Neck; Selin Tansi-Glickman, Great Neck; Gaetano Bonasia, Bronx; Stephen P. Hebeisen, Cortland Manor; James A. Porter, Farmingdale, all of NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/821,657

(22) Filed: Jan. 26, 2001

Related U.S. Application Data

(63) Continuation of application No. 09/213,497, filed on Dec. 17, 1998, now abandoned.
(60) Provisional application No. 60/085,814, filed on May 18, 1998.

(51) Int. Cl.[7] .............................................. H05B 37/00
(52) U.S. Cl. ......................... 315/312; 315/158; 315/295
(58) Field of Search ................................ 315/149–159, 315/291–296, 312, 316, 318, 324, 362

(56) References Cited

U.S. PATENT DOCUMENTS

| 4,649,323 A | * | 3/1987 | Pearlman et al. ............ 315/307 |
|---|---|---|---|
| 4,733,138 A | * | 3/1988 | Pearlman et al. ............ 315/307 |
| 4,965,492 A | * | 10/1990 | Blowyn ....................... 315/291 |
| 5,066,896 A | * | 11/1991 | Bertenshaw et al. ......... 315/291 |
| 5,091,677 A | * | 2/1992 | Bleich et al. ................ 315/360 |
| 5,357,170 A | * | 10/1994 | Luchaco et al. ............. 315/158 |
| 5,637,964 A | * | 6/1997 | Hakkarainen et al. ....... 315/295 |

* cited by examiner

Primary Examiner—Don Wong
Assistant Examiner—Wilson Lee
(74) Attorney, Agent, or Firm—Paul J. Sutton

(57) ABSTRACT

An electrical control system including a plurality of electrical devices communicates over a network and interfaces and works with non-protocol devices and signals that only send/receive an on/off digital signal or send/receive one of numerous analog signals. The devices communicate with one another over a network implemented using different types of media. The system includes the necessary user interfaces, network management system interfaces and displays to provision, administer, operate and maintain the electrical device network. The system is particularly suited for lighting control applications to control the lights and/or other electrical loads within an office, building, room or home by motion detection, ambient light sensing, switching functions, dimming functions, temperature sensing functions and humidity sensing functions. Most devices are equipped to put the device in an ON, OFF, or AUTO mode.

69 Claims, 21 Drawing Sheets

| INPUTS | | |
|---|---|---|
| BIT POSITION | DESCRIPTION | VALUES |
| 0 | OCCUPANCY | 0: UNOCCUPIED<br>1: OCCUPANCY |
| 1 | SWITCH | 0: NOT PRESSED<br>1: PRESSED |
| 2 | OVERRIDE | 0: AUTO<br>1: LIGHT ON |

| OUTPUTS | | |
|---|---|---|
| BIT POSITION | DESCRIPTION | VALUES |
| 0 | LOAD | 0: LOAD OFF<br>1: LOAD ON |
| 1 | FEEDBACK | 0: FEEDBACK OFF<br>1: FEEDBACK ON |

FIG. 13B

NETWORK BASED ELECTRICAL CONTROL SYSTEM WITH DISTRIBUTED SENSING AND CONTROL

REFERENCE TO RELATED APPLICATIONS

This application is based on U.S. Provisional Patent Application Serial No. 60/085,814, filed May 18, 1998 and is a continuation of U.S. patent application Ser. No. 09/213,497, filed Dec. 17, 1998 now abandoned.

FIELD OF THE INVENTION

The present invention relates generally to the field of control systems and more particularly to a lighting control system for controlling the operation of electrical lighting devices.

BACKGROUND OF THE INVENTION

Today, automation systems are being installed in more and more buildings, including both new construction and in structures that are being rebuilt. The incentives for putting automation systems into a building are numerous. High on the list are reduced operating costs, more efficient use of energy, simplified control of building systems, ease of maintenance and of effecting changes to the systems. Facility managers would prefer to install systems that can interoperate among each other. Interoperability is defined by different products, devices and systems for different tasks/applications and developed by different manufacturers that can be linked together to form flexible, functional control networks.

An example of a typical automation system includes lighting controls, HVAC systems, security systems, fire alarm systems and motor drives all possibly provided by different manufacturers. It is desirable if these separate systems can communicate and operate with each other.

Prior art automation systems generally comprised closed proprietary equipment supplied by a single manufacturer. With this type of proprietary system, the installation, servicing and future modifications of the component devices in the system were restricted to a single manufacturer's product offering and technical capability. In addition, it was very difficult or impossible to integrate new technology developed by other manufacturers. If technology from other manufactures could be integrated, it was usually too costly to consider.

Thus, it is desirable to create an open control system whereby individual components and subsystems share information among one another. A few of the benefits of using an open system include reduced energy costs, increased number of design options for the facility manager, lower design and installation costs since the need for customized hardware and software is greatly reduced and since star configuration point to point wiring is replaced by shared media and lastly, system startup is quicker and simpler.

In addition, expansion and modification of the system in the future is greatly simplified. New products can be introduced without requiring major system redesign or reprogramming.

Prior art control networks typically used a bus topology. A block diagram illustrating an example prior art control network that utilizes a bus topology is shown in FIG. 1. The control network, generally referenced 10, comprises a plurality of sensors and control outputs that are all interconnected using twisted pair wiring, for example. Various sensors, such as dimming sensor 16, switch 18 and occupancy sensor 20, are connected by point to point wiring to a central multiplexer 12. Actuator/control devices, such as dimming control 22, switch control 24 and occupancy control 26 are connected to the main bus 14 via individual point to point wiring. The central multiplexer 12 is connected to the main bus 14 via additional wiring. In such a network, all devices must be connected to the main bus 14 in order to function within the control network 10.

The use of bus topology has the disadvantage of requiring costly, time consuming installations because every device in the network must be connected in 'home run' fashion directly to the main bus 14. Installers are not able to branch or star the wiring where it is convenient and cost effective to do so.

SUMMARY OF THE INVENTION

The present invention comprises an electrical control system that includes various electrical devices that have the capability to communicate over a network. The various electrical devices include sensors, transducer functions, switching devices, dimming devices and controlling devices. The devices communicate with one another over a network that may be implemented using one or more different types of media. Media types include, for example, twisted pair, power line carrier, coaxial, optical fiber, RF and infrared. Some of the devices may or may not include an integral power supply. Thus, some devices may depend on other devices to supply them with electrical power.

In addition, the system includes the necessary user interfaces, network management system interfaces and displays to provision, administer, commission, operate and maintain the electrical device network. The system is particularly suited for lighting control and load switching/dimming applications, including but not limited to, providing a means to control the lights and/or other electrical loads within an office, building, room or home by means of motion detection, ambient light sensing, switching functions, dimming functions, temperature sensing functions and humidity sensing functions. Most devices are equipped with a means to put the device in an on, off or auto mode.

The communications network system and the electrical devices that comprise the system operate in an environment such as might be found in an office, school, home, industrial plant or other automated facility. In these types of environments, sensors, switching and dimming control actuators are used for electrical control applications including lighting, energy monitoring and control, end user convenience and HVAC control.

The electrical devices that comprise the control system generally comprises one or more of the following five basic elements: (1) user interface, (2) actuator element, (3) power supply and media connections, (4) communications media and protocol and (5) one or more sensor inputs.

For the control system to function it is not necessary for all five of the above elements be present. A device may operate if connected to elements in other devices which are not part of the system, such as a separate micro PLC type device connected directly to a relay or other switching element which, in turn, is connected to one or more of the sensors within the system. Further, it is intended that many other sensors, other than those disclosed herein, could also work directly with the system of the present invention. Typically, little or no modification is required and the required functional profiles and variables or other application code can be downloaded to the appropriate user interface, actuator element, power supply or sensor inputs.

Additionally, other functions can be performed which include some type of annunciation either by sound (by using a buzzer), by sight (by employing LEDs) or by controlling the lights in the room. For example, if there is a fire and the smoke detector transducer and sensor indicates the fire, a local buzzer could annunciate at the sensor and also cause the lighting control unit to flash lights. Alternatively, it could illuminate specially designed lights fixtures made for this purpose. Also, the lighting system could be controlled through inputs received from a security system which outputs commands so as to put the home or office into a 'lived in look' mode or other appropriate lighting modes.

The user interface, utilized by a user to configure and maintain the devices situated on the network, is optionally present in the network. The user interface can be a hand held device, laptop, palmtop, desktop or a remote control device. In addition, the user interface can be located locally or remotely and may comprise a computer, a touch screen panel or display, a simple keypad or any other wall, surface, tabletop, cellular or other type device that allows any user to interface with the system to either receive information, to control elements of the system, to perform network management on the system and its devices or to report automatically or upon command.

The user interface provides the home or building owner the ability to establish the configuration of the system and it's desired performance or potential future performance. The user interface also provides real time control and monitoring in addition to providing unscheduled control and information monitoring functions.

The actuator elements of the system may comprise numerous different types of devices including, but not limited to, switching devices, dimming devices, multiple load controlled devices, single load control devices, devices controlled locally, remote control devices, open air gap switching devices, electronic switching or dimming devices, incandescent lighting control devices, fluorescent lighting control devices, high voltage electronic ballast control devices (including both switching and dimming), low voltage ballast control devices (including both switching and dimming), zero crossing circuitry and switching coordination devices and other relay type or load controlling devices.

The power supply component for some of the devices in the system may include means to operate from 100 to 305 VAC. This type of device supplies an output voltage between 8 and 26 VDC as well as 24 VAC to its own internal circuitry in addition to devices external to it. The means for distributing the electrical power to other devices could be accomplished via any suitable means including twisted pair cabling, electrical power line cables or any other power carrying media.

Another key feature of the system is a communications media and protocol that together form a communications network allowing messages to be communicated (1) between devices within the system and (2) between devices located within the system and devices located external to the system. The messages comprise, among other things, commands for controlling and/or monitoring signals and data. These messages could be tightly coupled, loosely coupled or of a macro broadcast nature. In addition, they may be one way, bi-directional, with established priorities or without. The network communications medium may comprise, for example, twisted pair Category 5 cabling, coaxial cabling, a standard POTS line, power line carrier, optical fiber, RF or infrared. The medium may be common or it may be shared with the possibility of requiring the use of gateways, routing devices or any other appropriate network device for carrying control commands and data signals.

Depending on the type of network medium in use in the system, the devices within the system include, within their housings, a slot that allows for the connection of a bus terminator. The bus terminator is typically an RC network that is connected to the device and serves to mechanically, as well as electrically, connect the device to the network communication line, e.g., twisted pair, coaxial, optical fiber, etc.

Thus, the system is able to communicate to devices within the system to provide intrasystem control and monitoring as well as to communicate outside the system to provide intersystem control and monitoring. Data and/or control commands are received and transmitted, various loads or control devices can be activated and switched locally and/or remotely, real time relative readings can be received and transmitted, devices can be calibrated externally in an automatic self adjusting way or via a communication link over the network.

It is important to note that both the number of and types of sensors that can be used in the system are almost endless. Examples suitable for use to control lighting and other functions in a home or office include: multiple, dual or singular occupancy and security sensing by means of passive infrared, active infrared, ultrasonic, RF, microwaves. Each may employ other single or multiple transducers such as temperature sensing, relative humidity sensing, ambient light sensing, single, dual or multiple control switching and/or dimming sensing, wish button or text scene controller sensing. Other possible sensing functions include single or multiple sensors within one device for sensing CO, smoke, security, air flow, engine monitoring, gases, water flow or level, time of day and other transducer devices.

The utility of the system of the present invention, including the individual devices that comprise it, can be illustrated using an example. Consider, for example, that in order to improve the chances of interoperability amongst different products which are developed and sold by different organizations, it is desirable to have a system which can reliably provide lighting control without restricting the building owner to devices or systems from one manufacturer. This is especially so if the system does not allow for the addition of other types of sensors that are needed to control the lighting or HVAC within an office complex. Thus, the system is very useful as it not only will function with devices that were originally designed to work within the system, but will also operate with devices developed by other organizations which utilize the same communications protocol. Note that the choice of communications protocol and physical layer for the medium is not material to the invention. Any suitable physical, link and network layer may used to implement the system of the present invention including, but not limited to the communication layers specified in the LonWorks protocol (Echelon), CEBus (Intellon), X10, CAN, BACNet, etc.

The system offers an installer a control unit, which may be a single device that comprises (1) a power supply to provide electrical power to other sensors and peripherals, (2) a system reset function, (3) load switching or dimming elements, (4) the ability to accept additional functionality permitting program instructions to be downloaded to internal nonvolatile memory, e.g., flash memory, over the network, (5) the ability to send operating mode scheduling commands, and (6) multiple processing means for implementing networking firmware in addition to application firmware previously downloaded or stored in ROM.

Moreover, given that devices generally have the ability to accept changes to their firmware via the network, it is preferable that the control units comprise a microprocessor or microcontroller which functions to execute the networking functions and the application or functionality of the system and the control unit itself. It is also preferably that the control unit is connected, via the network or directly, to a variety of sensors that are used to control various loads such as lighting and HVAC system loads. In addition, the control unit may be adapted to (1) help implement a security system inside or outside of a room or building, (2) sense sensor signals and send an alarm to a fire alarm or (3) automatically turn lights on during a fire, if so desired.

It is important to note that the invention is not limited to providing distributed sensing and control using a communication protocol such as Echelon's LonWorks or BACNet over a twisted pair hard wired media or RF link. The invention also provides the flexibility to incorporate additional devices into the system regardless of whether one organization or many manufacture them. As long as the devices are manufactured to conform to the communication specification/protocol in use, the devices can communicate and interoperate with each other over the network.

For example, a control unit device may contain a temperature sensor to detect hot spots on the device and, in response, automatically adjust the power, switching output or dimming output capability in accordance with the temperature measured in real time within the device. Thus, the total load carrying capability of the system can be switched or dimmed based upon the current ambient temperature in a plenum or riser or system power supply, for example. Other components of such a control device include application code and device control firmware, a load switching or dimming element, low voltage inputs/outputs including: 0 to 24 mA, 100 ohm to 20 Kohm resistive and 0 to 10 V analog inputs, 0 to 30 VDC and dry contact digital inputs, 0 to 12 VDC 100 mA source and sink digital outputs, other non-protocol inputs/outputs, 0 to 10 V ballast I/O, twisted pair to PLC routing, add-on modules to provide additional dimming capability, energy monitoring device and means to optionally receive power from a source of AC power.

Another aspect of the present invention includes the ability to link a single sensor to many different actuator devices, e.g., switching or dimming elements. The ability to be linked and bound to multiple devices and functional profiles within the same node or different nodes permits a single switch to control multiple loads.

Another aspect of the present invention includes energy monitoring and the ability to monitor changes in power, current or voltage and to determine if lamps have been burned out, for example. Thus, maintenance personnel can be provided with immediate indication that lamps have degraded or have burned out. The energy monitoring function may be performed within the device itself or it may be performed by means external to the device. The data that is gathered may include the energy consumed including the power factor, voltage level, current level, etc. In addition, the feature may determine if the electrical loads have changed by using an acceptance window for power, energy, power factor, voltage and current. A determination can be made whether the levels are within appropriate specifications for a given load or if degradation has occurred over time.

To illustrate the utility of the present invention the following application scenario is presented. The system of the present invention can be used to implement each aspect of the scenario. After returning home from work, you approach the front door and the security system is disarmed using a keychain remote control. The keychain remote also triggers a series of other activities to occur within the house. If it is after dusk, the lights in the kitchen and hallway automatically turn on to light the path. The air cleaner also turns on in the bedroom to clean the air for the evening before retiring to bed.

After leaving the house for the evening, utilizing the keychain remote, the security system is armed and the house is made to appear as if someone were home, i.e., lights going on and off randomly to give the impression someone is home, etc.

Before retiring for bed for the evening, the security system is armed from a bedside remote control. The system notifies you that the garage door is not closed. After closing the garage door, the security system is armed. The system makes a check of the house and turns off all the lights.

When a service person is expected to be at the house, the system can be remotely accessed to disarm it. Some areas, however, can be left armed to protect valuables such as jewelry. Passive sensors, i.e., light, infrared, microwave, etc., can be used to detect motion and sound and send a signal to an electrical device in another part of the house to alert you of the presence of a possible intruder.

Various devices in the home can be adapted to work together to provide increased value over the individual devices by themselves. For example, in the case of fire and smoke detection, the smoke detector can determine whether it is night or day, and in response, can cause the lights to go on when it senses a fire. A signal to turn off the air handling equipment can also be sent so as to not to fan the fire. Multiple sensors working together and communicating with one another can pinpoint the fire and indicate its exact location. If the fire is near a fuel supply, the supply is turned off. The fire department and/or other specified emergency telephone numbers can be dialed.

If unsafe levels of gases, such as CO, are detected, an audible, visual or motion signal can be activated. Additional responses include turning off exhaust fans, sending emergency notification to a monitoring center or emitting one or more alarm signals within the home or building.

An example of an application, specifically the food services and restaurant industry, is to provide audio, video, lighting control and the ability to place an order right at the customer's table in a restaurant. That is, via a user interface, e.g., display, touch screen, a customer at a restaurant can select and adjust different types of entertainment such as music, TV channels, movies, etc right at her/his table. Further, they could also set the lighting level to any desired level including different dim levels, scenes, patterns, etc. Through this interface, the customer could place their order, set their lighting level, select their entertainment, set the temperature and basically have full control over their comfort.

BRIEF DESCRIPTION OF THE DRAWINGS

The invention is herein described, by way of example only, with reference to the accompanying drawings, wherein:

FIG. 13B as a table illustrating the inputs and outputs of the state transition diagram shown in FIG. 13A;

DETAILED DESCRIPTION OF THE INVENTION

Notation Used Throughout

Figure 1:
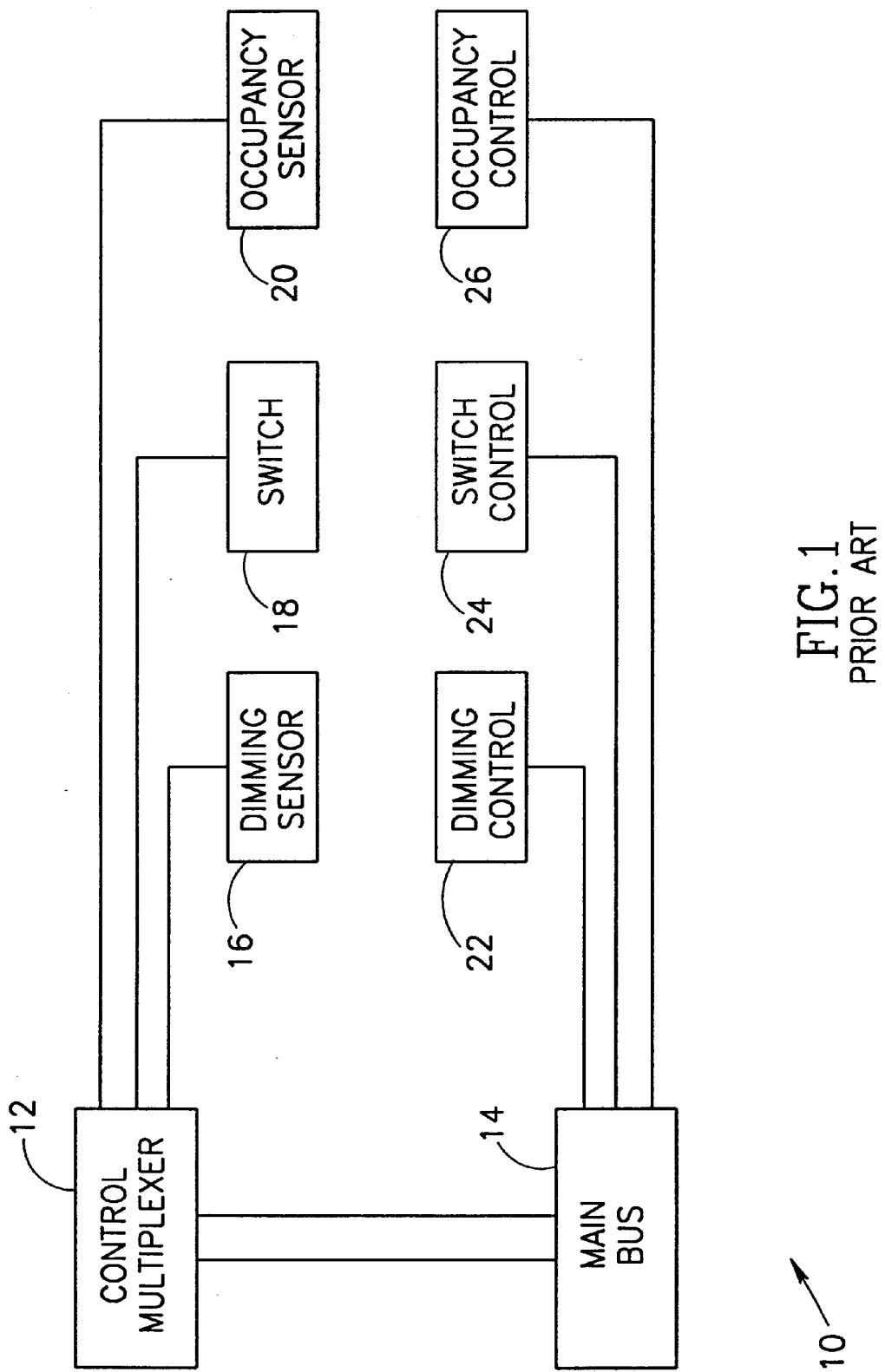
FIG. 1 is a block diagram illustrating an example prior art control network that utilizes a bus topology.

The following notation is used throughout this document.

| Term | Definition |
| --- | --- |
| AC | Alternating Current |
| API | Application Programming Interface |
| CO | Carbon Monoxide |
| EEPROM | Electrically Erasable Programmable Read Only Memory |

-continued

| Term | Definition |
| --- | --- |
| EIA | Electronic Industries Association |
| EMF | Electromotive Force |
| FET | Field Effect Transistor |
| HVAC | Heating Ventilation Air Conditioning |
| LED | Light Emitting Diode |
| MOV | Metal Oxide Varistor |
| PIR | Passive Infrared |
| PLC | Programmable Logic Controller |
| POTS | Plain Old Telephone Service |
| PWM | Pulse Width Modulation |
| RAM | Random Access Memory |
| RC | Resister/Capacitor |
| RF | Radio Frequency |
| ROM | Read Only Memory |
| SNVT | Standard Network Variable Type |

General Description

The present invention is a local operating network or network based control system suitable for multiple devices having different functionality. As an example, the local operating network can be applied to lighting, HVAC, monitoring and alarm systems. The local operating network, i.e., the system, comprises among one or more devices, a user interface, actuator element, power supply, communications media, media connections and protocol and sensor inputs. These components function to work together with other devices that can communicate using the same standard communication protocol to form a local operating network. The system comprises various device functionality including but not limited to various sensor and transducer functions such as motion detector sensors, temperature sensors, humidity sensors, light sensors and dimming sensors. The devices may be packaged in various form factors including but not limited to surface mount, flush mount, plug-in, hardwired, wall mount and single or dual gang wall box and ceiling mount. Other features include light harvesting or constant light maintenance, lumen maintenance, time of day scheduling, on/off/auto switching and sensing, single and multiple 20 A 100 to 305 VAC switching devices for incandescent, fluorescent lighting and motor loads and 8 A 800 W 100 to 305 VAC dimming triac devices with a series air gap relay element. The devices comprise software and/or firmware for controlling the operation and features of the device, 15 VDC power supply for supplying external devices with power, a reset push button for resetting the device and a communications network media interface.

To aid in understanding the principles of the present invention, the control system is described in the context of the LonWorks communication protocol developed by Echelon and which now is a standard EIA 709.1 Control network Protocol Specification, incorporated herein by reference. Other related specifications include EIA 709.2 Control Network Powerline Channel Specification and EIA 709.3 Free Topology Twisted Pair Channel Specification, both of which are incorporated wherein by reference.

The scope of the present invention, however, is not limited to the use of the LonWorks protocol. Other communication network protocols such as CEBus, etc. can be used to implement a control network within the scope of the present invention. In addition, non-protocol inputs can be tied in such as switch and various other low voltage contact closures or outputs or analog signal inputs and outputs.

Figure 2:
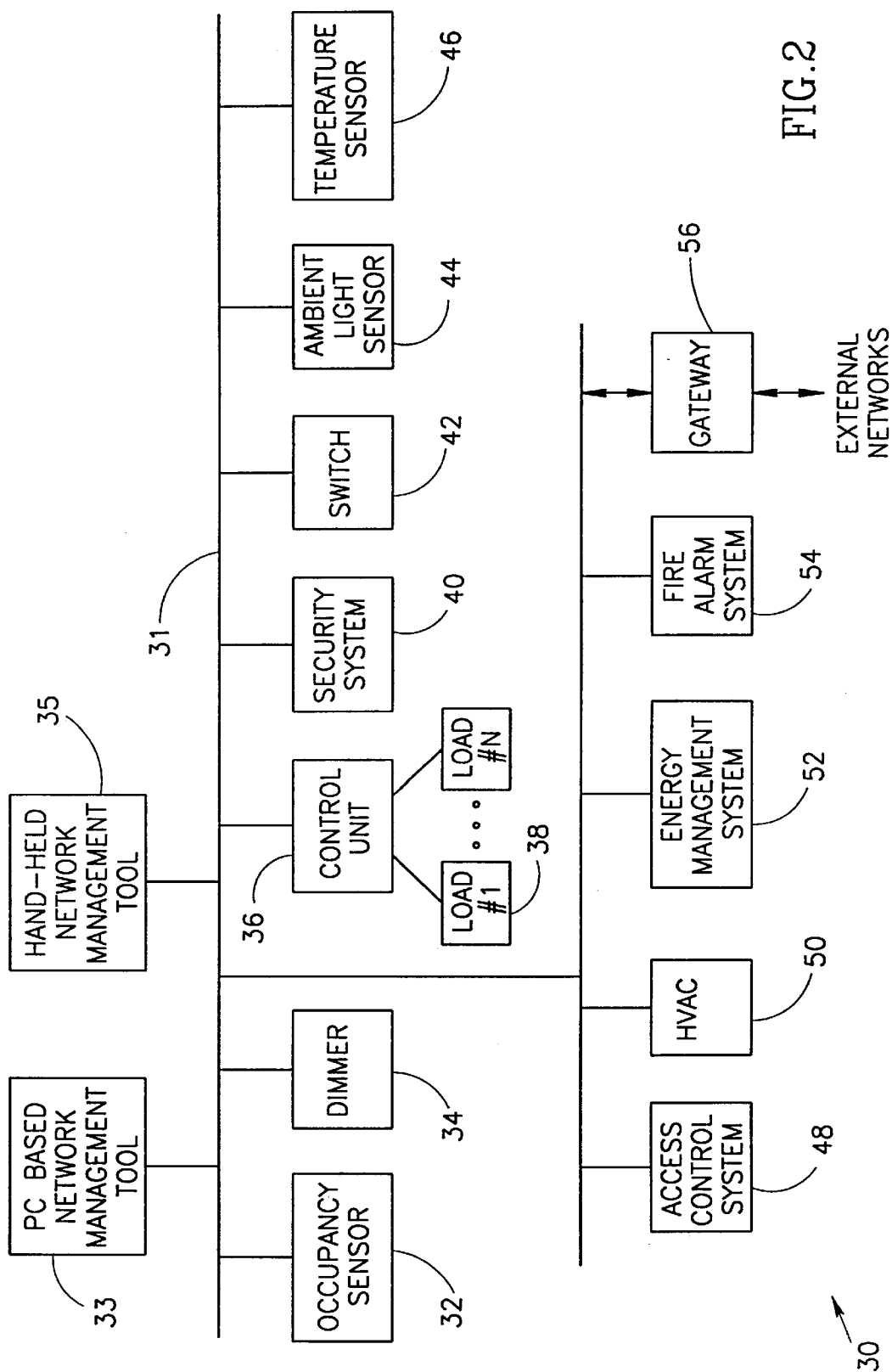
FIG. 2 is a block diagram illustrating an example network consisting of various electrical controls, devices and sensors.

A block diagram illustrating an example control system network consisting of various electrical controls, devices and sensors is shown in FIG. 2. The control network, generally referenced 30, comprises an example control system that has applications in lighting, HVAC systems, fire and security. The network 31 may comprise any type of media suitable with the network implemented. For the case of LonWorks, the media can be chosen from twisted pair, power line carrier, optical fiber, RF and coaxial. Different media can be used to construct a single network by the use of bridges, gateways or routers linking one type of media to another.

The network 30 comprises a lighting portion consisting of a control unit 36 with a plurality of attached electrical loads #1 through #N 38, occupancy sensor 32, dimmer 34, ambient light sensor 44 and switch 42. The network also comprises a temperature sensor 46 measures the local temperature, access control system 48 for controlling access to particular areas, HVAC system 50, energy management system 52, fire alarm system 54 and security system 40. A gateway 56 functions to bridge the local network 31 to external networks, which may or may not be LonWorks networks.

The system 30 also comprises a means for provisioning and administering the devices on the network. Two examples of controllers of network management tools are shown: a PC based controller 33 and a hand held controller 35.

A key feature of such a system is that the devices on the network can interoperate over the network 31. In addition, the system can be expanded at any time, and the functionality of the individual components can be changed at any time by downloading new firmware.

For a device to be interoperable it must communicate in accordance with the protocol specification in use in the system, e.g., LonWorks, CEBus, etc. If a device complies with the standard or protocol in use, it can communicate with other devices in the system. For example, the switch, in response to a user's command, can cause the control unit to turn on one of the connected loads. The temperature sensor may be bound (as defined by the LonWorks protocol) to the HVAC system, for example. After a threshold temperature is exceeded, the temperature sensor can respond by sending a command to the HVAC system to turn on the air conditioning.

In this system, all the subsystems, i.e., HVAC, security, fire alarm, etc. share information. Thus, building wide tasks can be performed from a single location through embedded software. This helps reduce operating costs and permits expansion, modifications and integration of new systems without disrupting the ongoing operation of the building. Also, devices that do not have a protocol can be tied into this system and thus can controlled and can share information, perhaps to a lesser degree. This permits simple low cost non-protocol devices to be tied into a network thus offering an optimized system solution.

Control Unit

Figure 3:
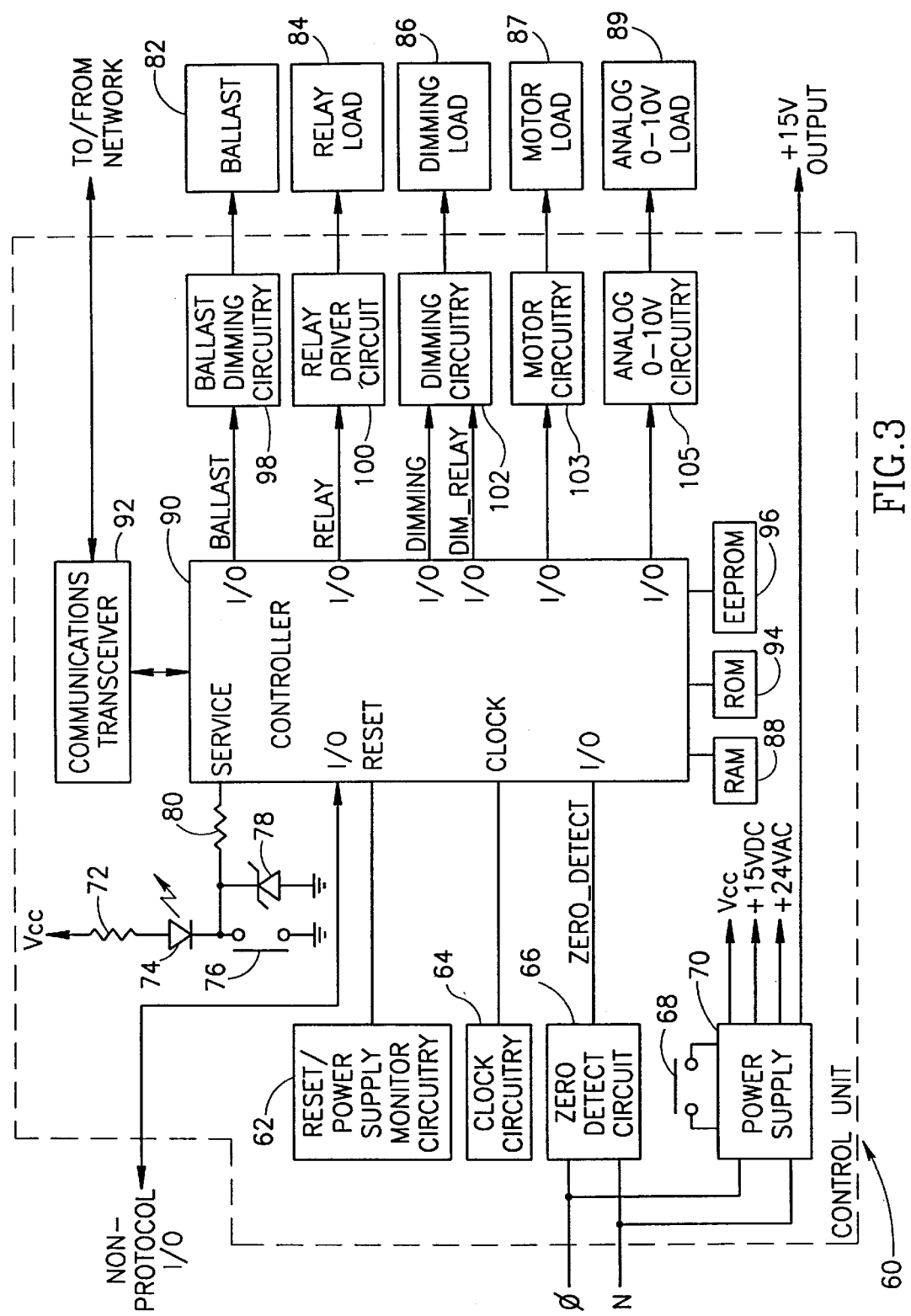
FIG. 3 is a block diagram of a control unit constructed in accordance with the present invention.

A block diagram of a control unit constructed in accordance with the present invention is shown in FIG. 3. The control unit, generally referenced 60, can be adapted for various applications, one of which being lighting controls which is the example presented hereinbelow. The control unit shown in this example is adapted to control motors, fluorescent and incandescent lighting loads. Control units adapted to function in other applications can also be constructed and is contemplated to be within the scope of this invention.

Various loads can be connected to the unit including one or more fluorescent ballasts 82, one or more relay loads 84, one or more dimming loads 86 and motor loads. The control unit 60 comprises a controller 90 to which are connected various components, reset/power supply monitor circuitry 62, clock circuitry 64, zero detect circuit 66, power supply 70, communications transceiver 92. Also included are ballast dimming circuitry 98, relay driver circuit 100 and dimming circuitry 102.

The controller comprises a suitable processor such as a microprocessor or microcomputer. For instance, in the context of a LonWorks compatible network, the controller may comprise a Neuron 3120 or 3150 microcontroller manufactured by Motorola, Schaumberg, Ill. More detailed information on the Neuron chips can be found in the Motorola Databook: "LonWorks Technology Device Data," Rev. 3, 1997, incorporated herein by reference. Memory connected to the controller includes RAM 88, ROM 94 for firmware program storage and EEPROM 96 for storing downloadable software and various constants and parameters used by the device.

A power supply 70 functions to supply the various voltages needed by the internal circuitry of the device, e.g., 5 V ($V_{cc}$), 15 V, 24 VAC, etc. In addition to the internal power needs, the power supply provides a supply voltage for external devices to use. For example, 15 V can be provided to a plurality of external devices for powering their circuitry. This reduces the complexity of external devices such as sensors, thus reducing their cost by eliminating the requirement of having a power supply onboard.

A momentary contact switch 68 is provided which functions to momentarily disconnect the external power supply, thus providing a reset function for devices that receive power from the control unit 60.

A clock circuit 64 provides the clock signals required by the controller 90 and the remaining circuitry. The clock circuit may comprise one or more crystal oscillators for providing a stable reference clock signal. The reset/power supply monitor circuitry 62 provides a power up reset signal to the controller 90. The circuit also functions to monitor the output of the power supply. If the output voltage drops too low, the reset circuit 62 functions to generate a reset signal as operating at too low a voltage may yield unpredictable operation.

In the case of LonWorks compatible networks, the control unit 60 comprises a service pin to which is connected a momentary push button switch 76 and service indicator 74. The switch 76 is connected between ground and the cathode of the LED 74. The anode of the LED is connected to $V_{cc}$ via resister 72. A zener diode 78 clamps the voltage on the service pin to a predetermined level. The switch 76 is connected to the service pin via a series resister 80. The service pin on the controller functions as both an input and an output. The controller 90 is adapted to detect the closure of the switch 76 and to perform service handling in response thereto. A more detailed description of the service pin and its associated internal processing can be found in the Motorola Databook referenced above.

The control unit 60 interoperates with other devices on the network. The communication means comprises a communication transceiver 92 that interfaces the controller 90 to the network. The communications transceiver 92 may comprise any suitable communication/network interface means. The choice of network, e.g., LonWorks, CEBus, etc. in addition to the choice of media, determines the requirements for the communications transceiver 92. Using the LonWorks network as an example, the communications transceiver may comprise the FTT-10A twisted pair transceiver manufactured by Echelon Corp, Palo Alto, Calif. This transceiver comprises the necessary components to interface the controller to a twisted pair network. Transmit data from the controller 90 is input to the transceiver which functions to encode and process the data for placement onto the twisted pair cable. In addition, data received from the twisted pair wiring is processed and decoded and output to the controller 90. Transceivers for other types of media such as power line carrier and coaxial, for example, can also be used.

As described above, the control unit also comprises means for controlling various lighting loads. In the example shown here, three different types of loads can be controlled: (1) ballasts for fluorescent lights, (2) any electrical device that can be controlled via a relay and (3) a dimming load. The ballast dimming circuitry 98, via a BALLAST signal from the controller 90 controls fluorescent ballasts. Relay loads are controlled by the relay driver circuit 100, via a RELAY signal from the controller 90. Dimming loads are controlled by the dimming circuitry 102 via DIMMING and DIM_RELAY signals output from the controller 90. Motor loads are controlled by the motor controller 103. Low voltage analog devices are controlled via analog 0–10 V circuitry 105.

In addition, external devices that do not implement a protocol can be tied into the network via the Non-Protocol I/O connection to the controller 90. Thus, non-protocol I/O devices can be controlled and can share information with other protocol enabled devices. This enables low cost non-protocol devices to be tied into the network thus providing an optimized system solution.

Figure 4:
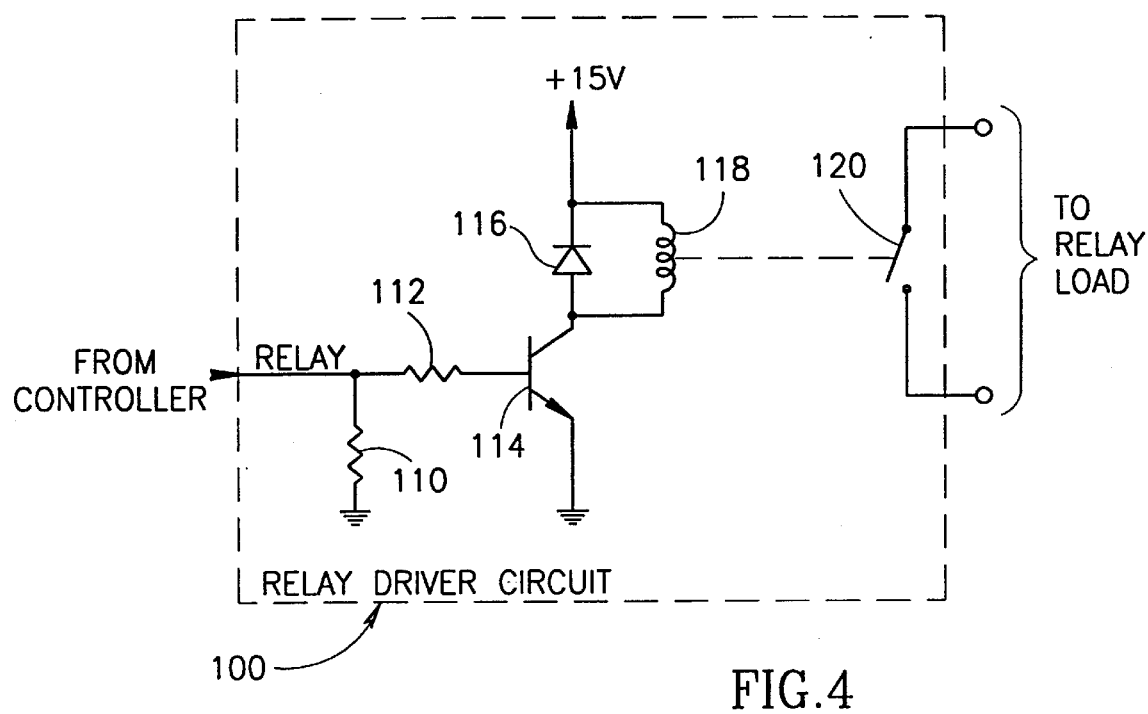
FIG. 4 is a schematic diagram illustrating the relay driver circuit portion of the control unit in more detail.

A schematic diagram illustrating the relay driver circuit portion of the control unit in more detail is shown in FIG. 4. The relay driver circuit 100 comprises a transistor circuit for controlling the coil 118 of a relay 120. The RELAY signal from the controller is input to the base of transistor 114 via resister 112 and resistor 110 connected to ground. The coil 118 is placed in parallel with a diode 116 and connected between the 15 V supply and the collector of transistor 114. The diode 116 functions to suppress the back EMF generated by the coil when it is de-energized. In accordance with the RELAY signal, the circuit functions to open and close the relay 120 that is connected to the relay load.

Figure 5:
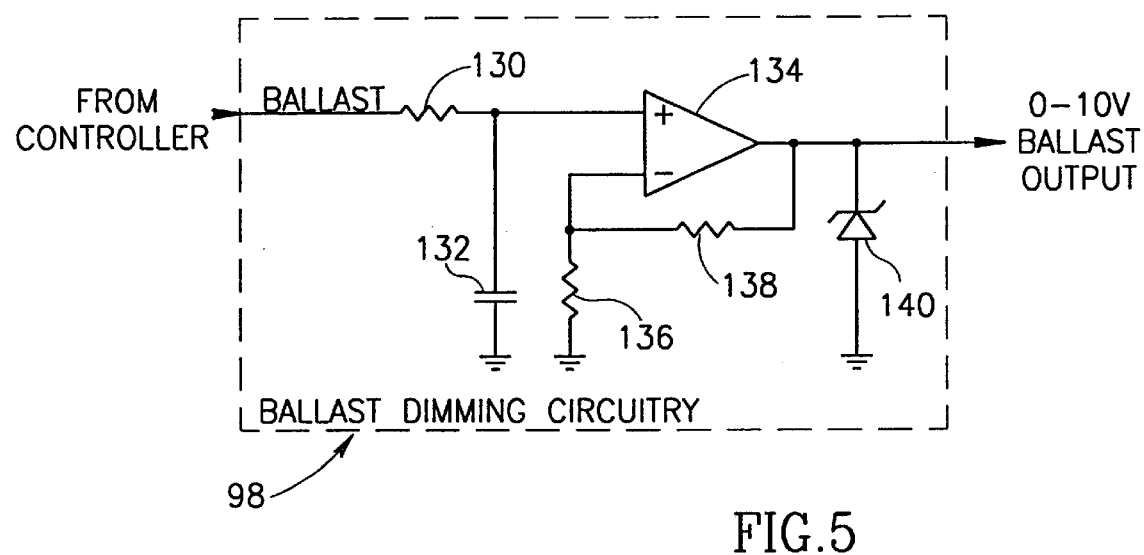
FIG. 5 is a schematic diagram illustrating the ballast dimming circuitry portion of the control unit in more detail.

A schematic diagram illustrating the ballast dimming circuitry portion of the control unit in more detail is shown in FIG. 5. The ballast dimming circuit 98 comprises an op amp 134 and associated components which functions to output a signal in the range of 0 to 10 VDC. The output signal causes fluorescent lights that are equipped with electronic ballasts to dim to a particular level. The electronic ballasts are adapted to receive a standard 0 to 10 V signal that corresponds to the desired light intensity level. The electronic ballast consequently adjusts the voltages applied to the bulbs they are connected to in accordance with the level of the input ballast-dimming signal. Additionally, the control unit can offer a 0 to 10 V output, via analog 0–10 V circuitry 105 (FIG. 3), whereby either 0 or 10 V correlates to the ON or maximum controlled state and the other voltage extreme, i.e., 10 V or 0 V respectively, correlates to the OFF or minimum controlled state. The voltages in between correlate linearly with load performance or by any other suitable fashion.

The pulse width modulated BALLAST signal from the controller is input to the non-inverting input of the op amp 134 via the integrating filter represented by the series resister 130 and the capacitor 132 to ground. This signal is then amplified to an appropriate level via the op amp 134 and its associated resistor network comprised of resistors 136 and 138. The resulting amplification of this particular circuit is approximately given by the following expression, $$1 + \frac{R_{138}}{R_{136}}$$

A zener diode 140 prevents the ballast output signal from exceeding a predetermined value. Note that the control unit may comprise a plurality of ballast dimming circuits for dimming a plurality of fluorescent light loads.

Figure 6:
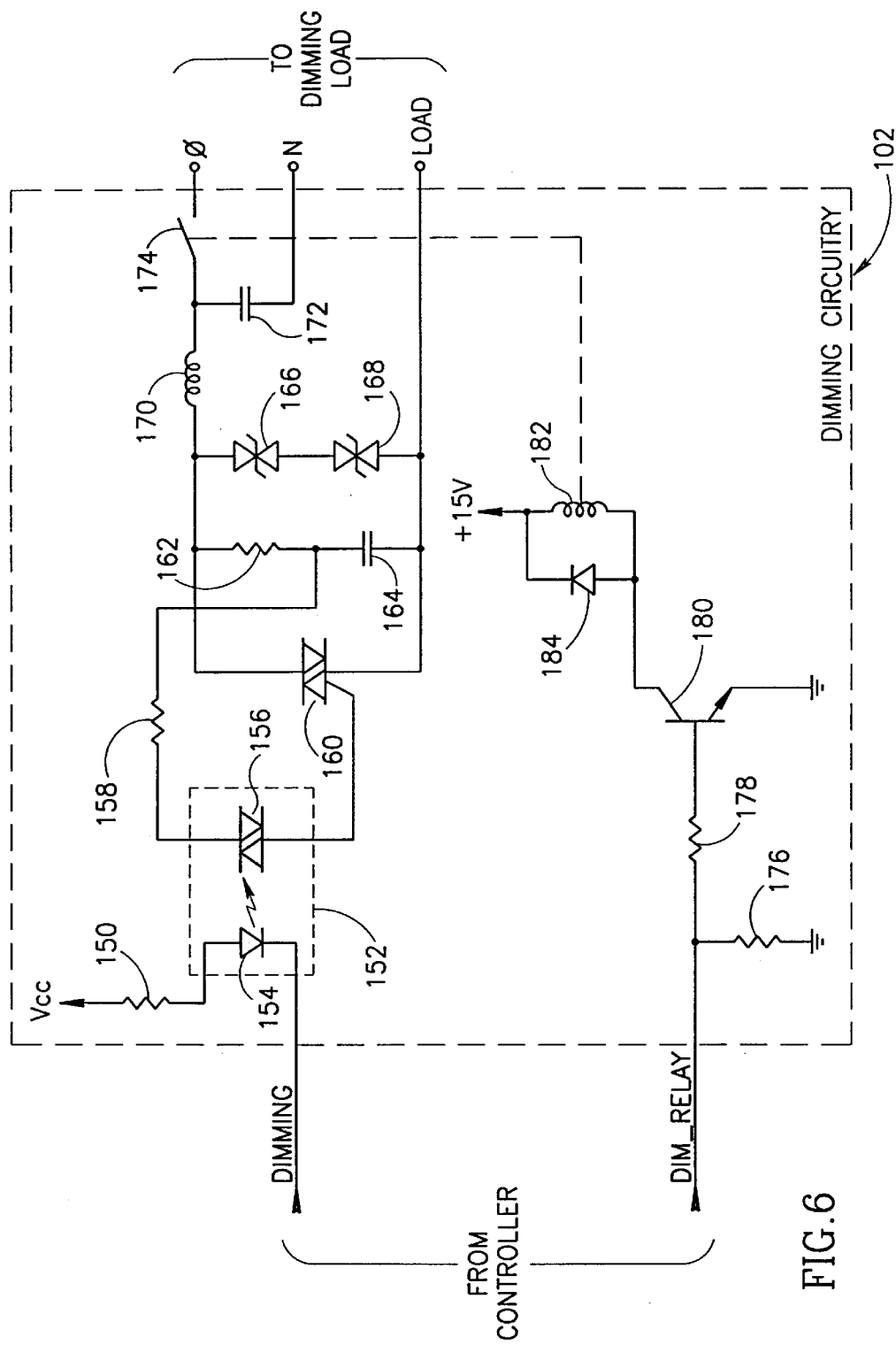
FIG. 6 is a schematic diagram illustrating the dimming circuitry portion of the control unit in more detail.

A schematic diagram illustrating the dimming circuitry portion of the control unit in more detail is shown in FIG. 6. The dimming circuitry 102 functions to control the light level of an incandescent load (a dimming load). The dimming circuit 102 comprises two portions: a triac dimming portion and a relay portion. The triac dimming portion comprises a triac 160 that is turned on at different points or angles of the AC cycle to effect the dimming function. The triac 160 is triggered by an opto coupled diac 152 which comprises an LED 154 optically coupled to a diac 156. The diac 156 is connected to the gate of the triac 160. The DIMMING signal from the controller turns on the LED 154 whose anode is connected to Vcc via resister 150. The DIMMING signal is brought low when the triac is to be turned on. The timing of the signal input to the opto coupled diac is synchronized with the zero crossings of the AC power. While the dim level of the load is set to non zero, the DIMMING signal is applied on a periodic basis, i.e., every AC half cycle.

Across the anode and cathode of the triac 160 are connected a resister 162, capacitor 164 and a pair of MOVs 166, 168. A coil 170 is located in series with a capacitor 172 connected to the neutral of the AC power. A relay 174 is placed in series with the triac for providing an air gap between the phase of the AC power and the load. The relay 174 is controlled by relay drive circuitry comprising transistor 180, resistors 178, 176, diode 184 and coil 182. The relay drive circuitry shown here operate similarly to the relay drive circuitry of FIG. 4. When it is desired to completely turn the load off, the controller asserts the DIM_RELAY signal which cause the relay 174 to open.

Figure 7:
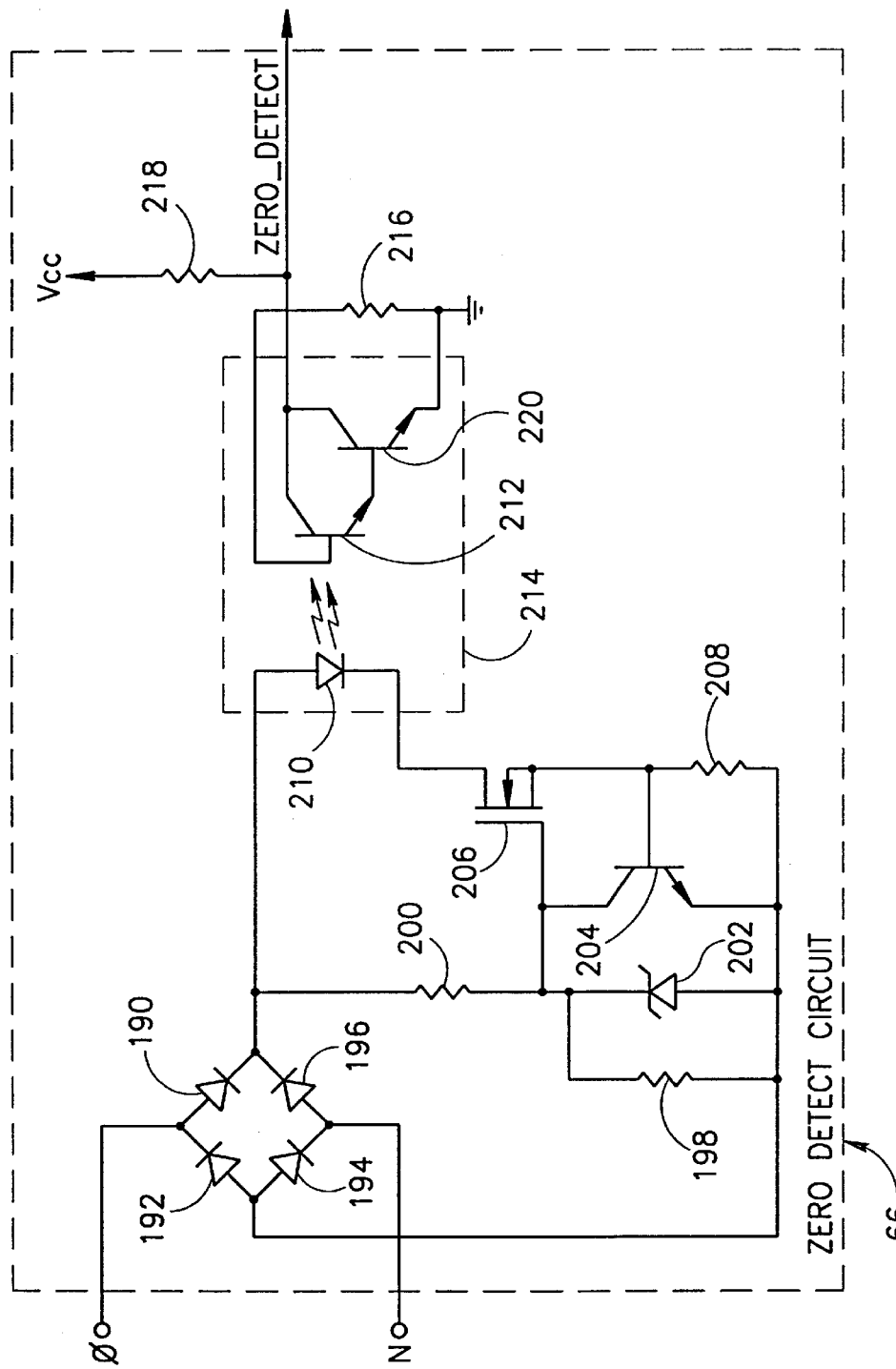
FIG. 7 is a schematic diagram illustrating a zero detect circuitry portion of the control unit in more detail.

A schematic diagram illustrating the zero detect circuitry portion of the control unit in more detail is shown in FIG. 7. The zero detect circuit 66 functions to generate a ZERO_DETECT signal every half cycle of the phase and neutral lines that is monitored by the controller 90. The phase and neutral lines from the AC power are input across a full wave bridge rectifier comprising diodes 190, 192, 194, 196. The voltage across the output of the bridge rectifier is placed across a voltage divider comprised of resisters 200, 198. A zener diode 202 is connected to the junction of the voltage divider. At the beginning of the AC cycle, the zener is off, and a voltage appears at the gate of FET 206, turning it on. A current path is created from the output of the bridge, through the LED 210, FET 206 and resister 208. The LED 210 in the opto coupler 214 is turned on. In response, the output of the opto coupler, which is pulled to Vcc by resistor 218 is brought low. Once the FET is turned on it conducts current, a voltage is developed across resister 208 which causes transistor 204 to turn on, clamping the gate of FET 206 to ground, turning FET 206 off. Thus, at each zero crossing of the AC voltage, a short pulse is generated which the controller can read. The zener diode 202 prevents the voltage across the gate of FET 206 from exceeding a predetermined voltage.

Figure 8:
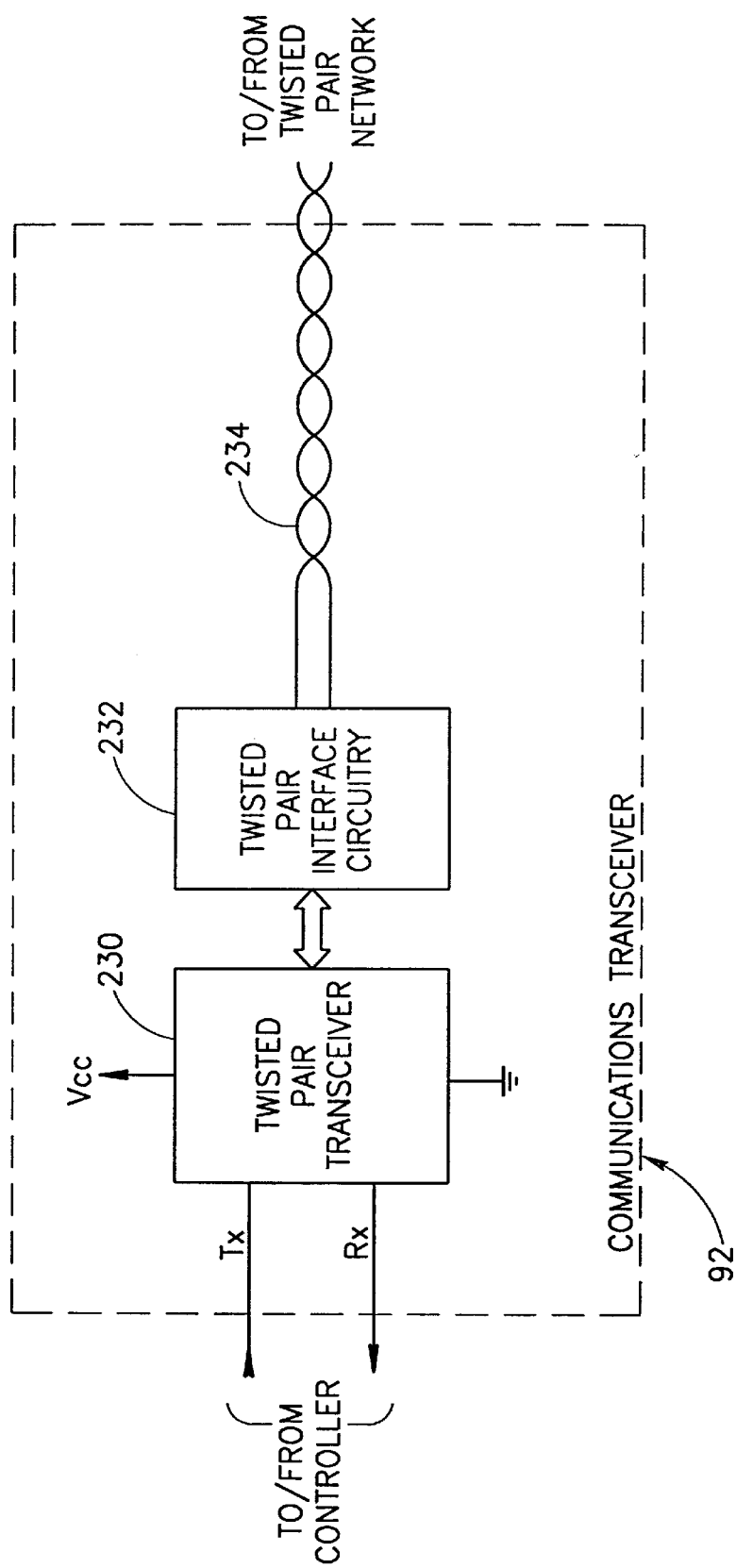
FIG. 8 is a block diagram illustrating the communications transceiver portion of the control unit in more detail.

A block diagram illustrating the communications transceiver portion of the control unit in more detail is shown in FIG. 8. As described previously, the communications transceiver 92 functions to enable the control unit to communicate with other devices over the network. Each device in the network incorporates communications means enabling it to share information with other devices. In this example, the communications transceiver 92 is adapted to transmit and receive data over twisted pair wiring. As mentioned previously, the communication transceiver could be adapted to other type of media as well including, but not limited to, power line carrier, coaxial, RF, etc.

The communications transceiver 92 comprises a twisted pair transceiver 230 for receiving Tx data from the controller and for outputting Rx data to the controller. In the transmit path, the twisted pair transceiver processes the Tx data received from the controller resulting in a signal suitable for placement onto the twisted pair network. The Tx output of the twisted pair transceiver, which has been converted to a differential 2-wire signal, is input to the twisted pair interface circuitry 232 which functions to adapt the differential transmit signal to the 2-wire twisted pair network 234.

In the receive path, the signal received over the 2-wire twisted pair network 234 is input to the twisted pair interface circuitry 232. The interface circuitry functions to output a 2-wire differential receive signal that is input to the twisted pair transceiver 230. The twisted pair transceiver 230 processes the differential receive signal and generates an output Rx signal suitable for input to the controller.

A more detailed description of the communications transceiver suitable for twisted pair networks and for other types of network media can be found in the Motorola Databook referenced above.

Figure 9:
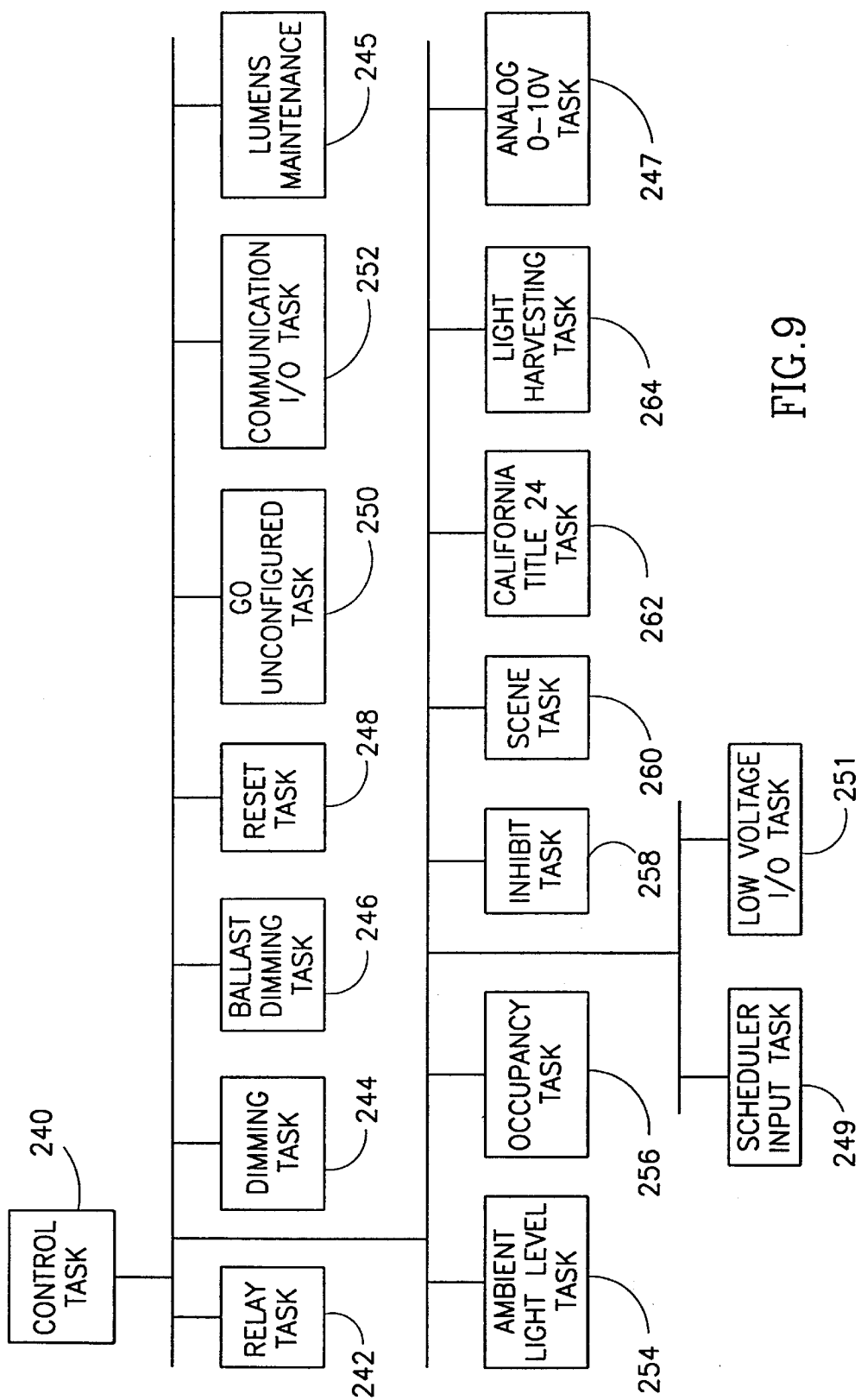
FIG. 9 is a block diagram illustrating the software portion of the control unit.

A block diagram illustrating the software portion of the control unit is shown in FIG. 9. The hardware and software components of the control unit in combination implement the functionality of the device. The software portion of the control unit will now be described in more detail. Note that the implementation of the software may be different depending on the type of controller used to construct the control unit. The functional tasks presented herein, however, can be implemented regardless of the actual controller and/or software methodology used. In the example presented herein, the controller is a Motorola Neuron 3120, 3150 or equivalent. Some of the functionality required to implement the control unit is incorporated into the device by the manufacturer. For example, the processing and associated firmware for implementing the physical, link and network layers of the communication stack are performed by means built into the Neuron processor. Thus, non-Neuron implementations of the control unit would require similar communication means to be able to share information with other devices over the network.

It is important to note that some of the tasks described herein may be event driven rather than part of a sequential program flow. The scope of the invention is not limited to any one particular implementation but is intended to encompass any realization of the functionality presented herein. In addition, some of the tasks are intended to function based on input received from other devices that are also connected to the network. For example, the occupancy task responds to input from an occupancy sensor device, described in more detail hereinbelow.

The various tasks described herein together implement the functionality of the control unit. Each of the tasks will now be described in more detail. The main control task 240 coordinates the operation of the control unit. The control task is responsible for the overall functioning of the control unit including initialization, housekeeping tasks, polling tasks, etc. In general, the control unit is adapted to respond to commands received over the network from external sensor and control devices. The control is effected by the use of network variables referred to as Standard Network Variable Types (SNVTs), in the case of LonWorks networks, for example. Thus, based on the values of the various network variables received by the control unit, the control unit responds and behaves accordingly. The following described the functionality provided by the control unit.

Relay

The relay task 242 functions to control the on and off state of the one or more relays in the control unit. Each relay has an associated relay driver circuit 100 (FIG. 3) and a relay load. Using network variables within the context of a LonWorks based network, the relay task may respond, i.e., be bound, to various network variables. The relay task may be suitably programmed to respond to settings of an ON/AUTO/OFF switch on a switch or dimming device. If the switching input value is set to on, then the relay is turned on regardless of the setting of a bound occupancy sensor device or other sensor device. Thus, if a user turns the switch to the ON position, the relay task would respond by turning the relay on provided that the control unit is not in the inhibited sate (described in more detail hereinbelow). The relay would stay on, regardless of the state of other bound sensor devices such as occupancy sensor devices. The relay task also responds to the on/off commands from a bound switch device, turning the relay on and off accordingly. When in the AUTO state, the relay load is controlled by the sensors bound to it over the network.

Occupancy

Figure 10:
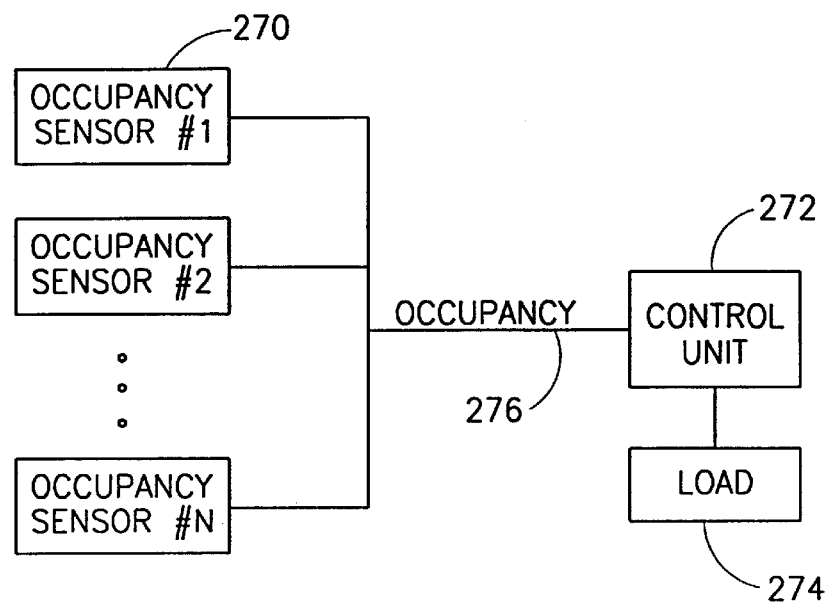
FIG. 10 is a block diagram illustrating an example network utilizing a plurality of occupancy sensors and a control unit coupled to a load.

The occupancy task 256 functions to control a relay or dimming load in accordance with the detection of motion in an area. One or more occupancy sensor devices can be bound to a relay or dimming object within the controller. A block diagram illustrating an example network utilizing a plurality of occupancy sensors and a control unit coupled to a load is shown in FIG. 10. Occupancy sensors 270 labeled #1 through #N are shown bound (OCCUPANCY 276) via the network to the control unit 272. The load 274 to be switched or dimmed is coupled to the control unit 272. In a LonWorks network, any number of sensors can be bound to the same object (load). Note that the occupancy task does utilize any feedback from the control unit. In addition, more than one load can be connected to and controlled by the control unit.

In addition, a light harvesting feature (described in more detail below) can be enabled or disabled for each input. This feature utilizes the light level sensed by an ambient light level sensor also connected to the network. When occupancy is detected, the sensor functions to generate a command that is sent to the occupancy task in the control unit. The command is sent via the setting of a value for a particular network variable. The occupancy task first checks the current level of the light. If light harvesting is enabled, the lights turn on in accordance with the light harvesting task (described in more detail below). The ambient light level is periodically checked and the brightness of the lights are adjusted accordingly. If light harvesting is not enabled, then the lights are turned on in accordance with the following Lighting Priority Order:

1. If the last light level value was not equal to zero, i.e., completely off or 0%, then the level of the lights will be set to the last dim level that was set at the time the lights were last turned off.
2. If the last light level value was equal to zero but the Preferred Level is not equal to zero then the level of the lights will be set to the Preferred Level value. Note that it is not desirable to set the lights to a 0% dim level, as confusion may arise whether the device is operating properly, since 0% dim appears as completely off.
3. If the last light level value was equal to zero and the Preferred Level is null then the level of the lights is set to maximum brightness, i.e., 100%.

Note that in each case, the light level is brought up to the required level in gradual increments, resulting in a gradual turn on of the lighting load. The Preferred Level value (also referred to as the 'Happy State') is a brightness level that is calculated based on history in order to reduce the number of writes to the EEPROM connected to the controller. The Preferred Level is generated by using a sliding check of the brightness levels set by the user over time. The Preferred Level is set if the light is turned on to the same brightness level a predetermined number of times consecutively, e.g., 5 times. If the current level is equal to the previous level the required number of times consecutively, then that particular brightness level is stored in EEPROM and a variable is set within the controller. The counter is reset once a current level does not match the current level. Note that a Preferred Level of zero is stored or permitted. Also, a low voltage drop out detect circuit can be employed to determine when the voltage is dropping and consequently save the last state and the preferred level.

Lumens Maintenance

In addition to light harvesting, the control unit can incorporate a lumens maintenance task 245 which functions to drive the dimming output to less than the maximum value. This results in driving the lighting load to less than its full wattage rating thus saving energy. As time progresses, the control unit can then drive the lighting load harder to maintain the light level at a constant lumens level. As a lamp ages its light output naturally decreases, all else being equal. Therefore, if the lighting output of the control unit initially drives the lamp at 90% of its maximum rating, then over time it can automatically, or through a scheduler input or through the use of an ambient light sensor, drive the lighting load at 91%, then 92% etc. Thus, providing lumens maintenance in addition to saving energy.

Dimming

The dimming task 244 functions to control the dimming load via the dimming circuitry 102 (FIG. 3). Each dimmer has an associated dimming control circuit and a dimming load. The dimming task is adapted to respond to one or more network variables that have been previously bound to it. Dimming devices connected to the network and bound to the dimming task, send brighten and dim commands to the dimming task. In response, the dimming task brightens or dims its associated dimming load accordingly.

Figure 11:
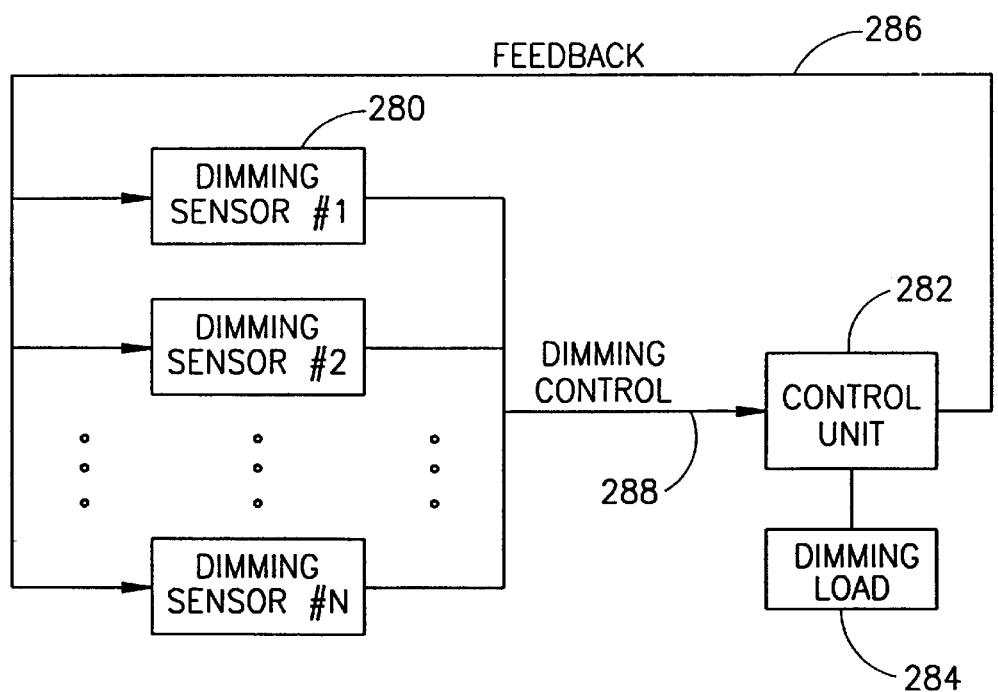
FIG. 11 as a block diagram illustrating an example network utilizing a plurality of dimming sensors and a control unit coupled to a dimming load.

A block diagram illustrating an example network utilizing a plurality of dimming sensors and a control unit coupled to a dimming load is shown in FIG. 11. A plurality of dimming sensors 280 labeled #1 through #N are bound (DIMMING CONTROL 288) to the control unit 282 via the network. The dimming load 284 is connected to the control unit 282. Note that the control unit may be adapted to control virtually any number of dimming loads in similar fashion to that described here. In addition, a feedback signal (FEEDBACK 286) is bound from the control unit to each of the dimming sensors 280.

On each of the dimming sensors, the brightness level is adjusted by pressing a switch. Pressing up on the switch increases the brightness level by an incremental amount, e.g., ½ or 1 full unit of resolution. When the switch is pressed up, a command is sent from the dimming sensor to the control unit that is bound to that dimming sensor. To dim the light, the switch is pressed in the down direction. The dimming sensor is described in more detail below.

If the light was previously off, then quickly tapping in the up direction will turn the lights on in accordance with the Lighting Priority Order described above. Once on, a quick tap in the down direction will turn the lights off. Once on, if the switch is pressed and held in the up direction, the brightness level increases until the maximum brightness level is reached at which point no further action occurs. As the light level ramps up, the user ceases holding the switch and the light level reached at that point is used. The maximum brightness can be achieved faster by quickly tapping twice on the switch in the up direction. Similarly, pressing and holding the switch in the down direction causes the light level to dim until the user cases holding the switch in the down direction. Continuously holding the switch causes the light to dim to the completely off level. Also, the rate of change of the dimming can be changed over the network by changing a variable that is made to be programmable.

If more than one dimming sensor is bound to the same dimming load in the control unit, then feedback is used to communicate information from the control unit to each of the dimming sensors bound to it. Feedback is utilized to inform the other sensors that are also controlling the dimming load as to the state of the dimming load. Thus, all the dimming sensors are synchronized and via feedback from the control unit are able to effectively track the actions of each other. The control unit preferably sends the feedback information after each command is received. For example feedback may be sent to all the bound dimming sensors 200 ms after the last command related to the light level is received.

California Title 24

The California Title 24 task 262 functions to modify the operation of the relay and dimming tasks. This mode can be set via a scene change. Scene changes are described in more detail below. Assuming that an ambient light sensor device is installed in the network, this task prevents the relay or dimming load from turning on when there is sufficient light. Thus, an occupancy sensor or switch input sensor bound to the relay or dimming load will not be able to turn the respective load on. In addition, if a sensor has already turned the load on, a switch input can only turn them off but not back on.

In connection with the dimming task described above, if there is sufficient light in the room, the lights will not turn on or brighten to a 'turn on' or brighten command from a dimming sensor.

In connection with the occupancy task, the lights will also not turn on if there is sufficient light in the room. In the California Title 24 mode, the lights may only be turned on via the occupancy sensor device detecting motion. A dimming sensor may dim the lights and turn them off. A dimming sensor may brighten the lights but they will immediately dim in accordance with the light harvesting setting (described in more detail below). If light harvesting is not active, attempting to brighten and/or turn the lights on via a switch sensor or dimming sensor will have no effect.

Ambient Light Level

The ambient light level task 254 functions to maintain a particular lux level within an area, if the user enables this mode. The task receives ambient light sensor data from an ambient light sensor bound to it over the network. The ambient light sensor periodically sends lux reading updates to the ambient light level task. The lux level to be maintained is provided by the user or set over the network.

The ambient light level task operates in conjunction with the occupancy sensor device and its related occupancy task. If an occupancy sensor detects motion, for example, the lights will be controlled in accordance with the current ambient light level reading. If the light level is greater than or equal to the current maintenance lux level setting, then the lights are not turned on. If, on the other hand, the light level is greater than or equal to the current maintain lux level setting, then the light is turned on in accordance with the Lighting Priority Order described above.

Light Harvesting

The light harvesting task 264 can be enabled or disabled by the user. This task typically operates in conjunction with the occupancy sensor and associated occupancy task. The detection of occupancy by the occupancy sensor triggers a light harvesting timer that is continuously running. Each time the timer expires, the settings are checked and the lights are brightened or dimmed in accordance thereto. The control unit, via the dimming task, attempts to maintain the light level by dimming or brightening the lights. If the difference is greater than a certain amount, the control unit updates the light level on a quicker basis until the difference falls below the threshold.

The light harvesting task generates a high light level and a low light level. Both the high and the low light level are determined by a maintain lux network variable or by a switch input provided that this mode is set. The high level is set to the maintain lux level plus 30 and the low level is set to the maintain lux level minus 30, thus forming a window.

The current lux level received from the ambient light sensor device is compared to the high and the low light levels previously set. If the difference ($\Delta$) is greater than 300, i.e., the lights are too bright, the light level is decreased by 1%. If the difference is between 30 and 300, the light level is decreased by 0.5%. If the difference is between −30 and 30, the light level is not modified and the timer is not updated. If the difference is between −300 and −30, the light level is increased by 0.5%. Similarly, if the difference is less than −300, the light level is increased by 1%. The following Table 1 summarizes the action of the light harvesting task.

TABLE 1

| Difference ($\Delta$) | Action |
|---|---|
| $\Delta > 300$ | Decrease light level 1% |
| $30 < \Delta < 300$ | Decrease light level 0.5% |
| $-30 < \Delta < 30$ | Do nothing |
| $-300 < \Delta < -30$ | Increase light level 0.5% |
| $\Delta < -300$ | Increase light level 1% |

The timer that determines the update of the light harvesting task is updated in accordance with the following events:

1. a change is made to the maintain lux level setting, via (i) network variable update or (ii) via manual user update.
2. occupancy detected.
3. a lux level reading from the ambient light level sensor is received via (i) periodic transmissions or (ii) the change in lux level sensed exceeds a predetermined threshold.

Note that lux level reading comprises the last read value from the photodiode or other light sensing element in the device. The user can update the maintain lux level setting by selecting a suitable scene and both enabling light harvesting and user updates to the maintain lux level setting. The update is accomplished using a switch sensor device or a dimmer sensor device in conjunction with a device containing an ambient light sensor. Typically, the occupancy sensor device also comprises an ambient light sensor element.

To accomplish the update, the user adjusts the light level to the desired level to be maintained. The user then presses the switch on the switch sensor or dimming sensor device. The ambient light sensor then takes a reading of the current light level and sets the maintain lux setting to the new reading. The new maintain lux level setting is sent via the network to the control unit.

Ballast

The ballast task 246 functions similarly to the dimming task but is intended to control fluorescent lights. The ballast dimming circuit 98 (FIG. 3) outputs a 0 to 10 V signal that is input to an electronic ballast. In response to the level of the signal, the light level of the fluorescent lamp is set accordingly.

Analog 0 to 10 VDC

The analog 0 to 10 VDC task 247 is similar to the Ballast task 246 except that the 0 and 10 V can be inverted. In addition, the signal can be programmed to accommodate a potentiometer or any other analog input requirement including: 0 to 24 mA, 100 ohm to 20 Kohm resistive and 0 to 10 V analog inputs, 0 to 30 VDC and dry contact digital inputs, 0 to 12 VDC 100 mA source and sink digital outputs and other non-protocol inputs or outputs.

Reset

The reset task 248 functions to place the controller into an initialization state. Variables are initialized, states of the various drivers are initialized, memory is cleared and the device begins executing its application code. The reset task executes at start up and at any other time it is called or the power is reset. The task functions to initialize the internal stack, service pin, internal state machines, external RAM, communication ports, timers and the scheduler. Before the application code begins executing, the oscillators are given a chance to stabilize.

Go Unconfigured

The go unconfigured task 250 provides the capability of placing a device (also refereed to as a node) in an unconfigured state. This is useful whenever the device needs to be placed in a certain state such as the unconfigured state. A major advantage of this feature is that it provides an installer of LonWorks based systems the ability to easily place the electrical device (the node) in an unconfigured state utilizing the same button 76 (FIG. 3) that is used is make a service request.

When the device is in the configured node state (also known as the normal operating mode state), the device is considered configured, the application is running and the configuration is considered valid. It is only in this state that both local and network derived messages destined for the application software layer are received. In the other states, i.e., the application-less and unconfigured states, these messages are discarded and the node status indicator 74 (FIG. 3) is on. The node status indicator is typically a service light emitting diode (LED) that is used to indicate to a user the status of the node.

A device is referred to as configured if it is either in the hard off-line mode (i.e., an application is loaded but not running) or in the configured node state as described above. A node is considered unconfigured if it is either application-less or in the unconfigured state, i.e., no valid configuration in either case. Via the go unconfigured task, a user can force the device into the unconfigured state so that it can be re-bound to the network, i.e., the device must be 'reset' within the LonWorks system.

More specifically, the term going unconfigured, is defined as having the execution application program loaded but without the configuration available. The configuration may either be (1) not loaded (2) being re-loaded or (3) deemed bad due to a configuration checksum error.

In a LonWorks device, an executable application program can place its own node into the unconfigured state by calling the Neuron C built in function 'go_unconfigured( )'. Using this built in function, an application program can determine, based on various parameters, whether or not an application should enter this state. When the device does enter the unconfigured state, the Node Status Indicator flashes at a rate of once per second.

The present invention utilizes the service pin on the controller, e.g., Neuron chip, to place the node in an unconfigured state. Under control of the firmware built into the Neuron chip, the service pin is used during the configuration, installation and maintenance of the node embodying the Neuron chip. The firmware flashes an LED suitably connected to the service pin at a rate of ½ Hz when the Neuron chip has not been configured with network address information. When the service pin is grounded, the Neuron chip transmits a network management message containing its 48 bit unique ID on the network. The information contained within the message can then be utilized by a network management device to install and configure the node. The Neuron chip checks the state of the service pin on a periodic basis by the network processor firmware within the chip. Normally, the service pin is active low.

Further details on the implementation of the go unconfigured task can be found in co-pending U.S. application Ser. No. 09/080,916, filed May 18, 1998 entitled APPARATUS FOR AND METHOD OF PLACING A NODE IN AN UNCONFIGURED STATE, similarly assigned and incorporated herein by reference.

Communication I/O

The communication I/O task 252 functions in conjunction with the communication means located in the controller and the communication transceiver connected to the controller. The controller itself comprises means for receiving and transmitting information over the network. As described previously, the communications firmware for enabling communications over the network is built into the Neuron chip. Further details can be found in the Motorola Databook referenced above.

Inhibit

The inhibit task 258 provides the capability of inhibiting and overriding the normal operating mode of one or more devices connected to the communications network. This task is intended to operate within an electrical network that is made up of a plurality of devices wherein a group of devices is capable of commanding the control device to apply and remove electrical power from an electrical load connected to it. The devices or nodes communicate with the control device over the communications network, as described previously.

Figure 12:
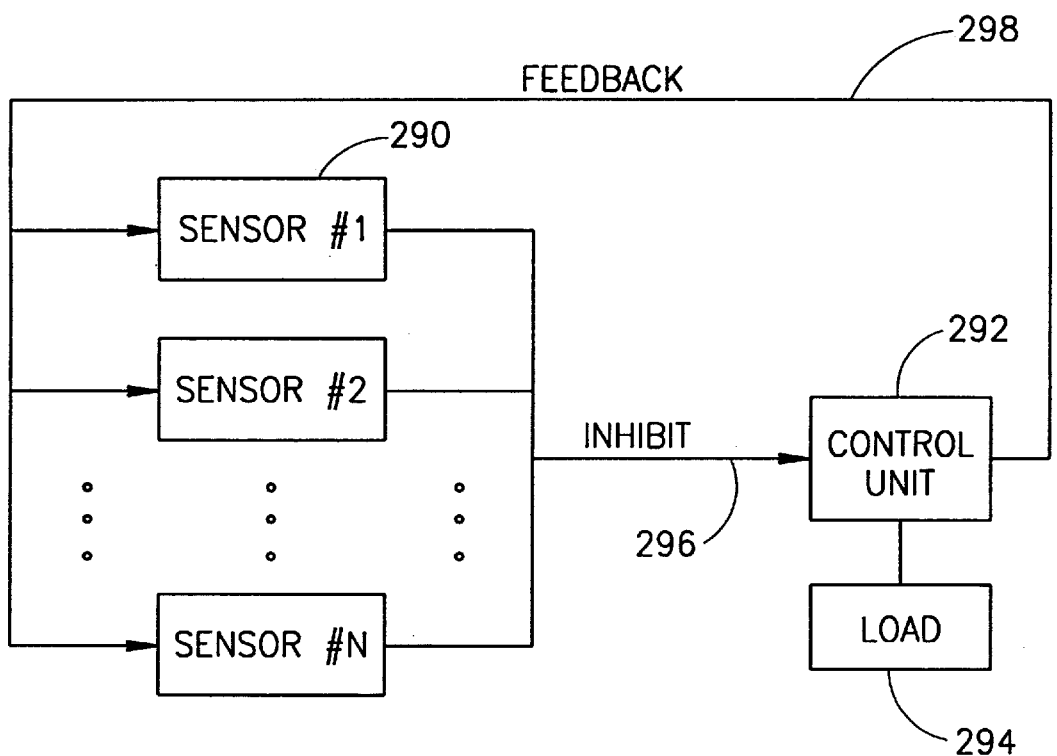
FIG. 12 is a block diagram illustrating an example network utilizing a plurality of sensors and a control unit coupled to a load wherein an inhibit signal is communicated to the control unit which supplies a feedback signal to the plurality of sensors.

A block diagram illustrating an example network utilizing a plurality of sensors and a control unit coupled to a load wherein an inhibit signal is communicated to the control unit which supplies a feedback signal to the plurality of sensors is shown in FIG. 12. The sensor devices 290 labeled #1 through #N may comprise any type of sensor such as an occupancy sensor, switch or dimming sensor. Each sensor device 290 is bound (INHIBIT 296) to the control unit 292. The load 294 is connected to the control unit 292. A feedback variable is bound (FEEDBACK 298) from the control unit 292 to each of the sensors 290.

When one of the sensors is turned off, i.e., its switch setting is placed in the OFF position, the inhibit task is operative to inhibit the normal operating mode of all the other input sensors and the control unit. Note that the term 'turning a device off' includes switching the device off, disabling the device, placing the device in standby mode or tripping the device. There can be multiple sensor devices simultaneously in the off, disabled, standby or tripped mode. The control unit and its load remain inhibited until all the sensor devices are no longer in the off, disabled, standby or tripped mode. Thus, electrical power to the load controlled by the control unit remains disconnected until all sensor devices are in the on position.

This feature is particularly suited to permit maintenance or service to be performed in a safe manner on (1) any of the sensors, i.e., switching, occupancy, dimming, etc. sensor devices, logically connected to the same control unit or on (2) the load physically connected to the control unit or in (3) the circuit breaker.

Each sensor device comprises switch means for placing the input device into an off, disabled, standby, tripped or maintenance inhibit mode. The switch means can be implemented using mechanical or electronic means or a combination of the two either at the device itself or remotely over a network via one or more control commands. A pull out tab or mechanical arm can be used to put the input device into the maintenance off mode when it is pulled out. The pull out tab or mechanical arm would leave the input device in normal operating mode when pushed back in.

In either case, when the input device is placed in the off position, an inhibit message is sent to the control unit over the network. In response, electrical power to the attached load is removed. Subsequently, all other sensor devices are inhibited from causing power to be applied to the load. This permits safe access to the control unit and to the load for service or maintenance reasons. The normal operating mode of all the sensor devices connected to the same control unit is inhibited or overridden. Until all sensor devices that have previously been placed in the off mode are put into the on mode and returned to their normal operating condition, all sensor devices are not permitted to change the state of the load or the control unit.

Further details on the implementation of the inhibit task can be found in co-pending U.S. application Ser. No. 09/045, 625, filed Mar. 20, 1998 entitled APPARATUS FOR AND METHOD OF INHIBITING AND OVERRIDING AN ELECTRICAL CONTROL DEVICE, similarly assigned and incorporated herein by reference.

Scene Modes

The scene task 260 provides a user with a plurality of different scenes from which the control unit can be placed into upon receipt of a command over the network. Scenes provide a user with a limited degree of control over the mode of operation of the control unit. A scene is defined as a set of preferences or options that together change the characteristic operation of the control unit in a desired fashion. The choice of scene is communicated to the control unit from another device, i.e., a network management tool, over the network.

The control unit is adapted to 'expose' its internal settings and option selections so as to permit a user to fine tune the behavior of the control unit. In effect, the scene task exposes a pseudo Application programming Interface (API) that a user can 'program' to achieve any desired characteristic operation of the device.

Each scene is uniquely numbered, e.g., 0 through 255, and can be selected on demand at any time. Each scene is composed of primitives or parameters defining the behavior of a single option within the device. For example the scene to turn the dimming load off, comprises the necessary primitives to effect the turning off of the triacs which control the dimming load. The control unit can 'learn' scenes by sending it a command structured similar to the following:

SCENE X=LEARN [parameter #1, parameter #2, . . . , parameter #N]

Once a scene is 'programmed' it can be selected simply using its assigned scene number.

The following tables list several examples of scenes and their function. The various scenes are grouped into separate tables according to their relationship with the hardware, i.e., dimming, 0 to 10 ballast, etc. Table 2 below lists the generally related scenes and their descriptions.

TABLE 2

| Scene | General Description |
|---|---|
| 1 | Emergency mode 1 - all lights on |
| 2 | Emergency mode 1 - all lights off |
| 3 | Emergency mode 1 - all lights flashing |
| 4 | Night mode - triac and 0 to 10 V at 20% dim |
| 5 | Set all switch input to California Title 24 mode |
| 6 | Set all switch inputs to Master Switch mode |
| 7 | Return to defaults |

Table 3 below lists the scenes and their descriptions related to the dimming (triac) capability of the control unit.

TABLE 3

| Scene | Dimming Description |
|---|---|
| 8 | Lights on |
| 9 | Lights off |
| 10 | Lights flashing |
| 11 | Set switch input to California Title 24 |
| 12 | Set switch input to mast Switch mode |
| 13 | Set switch input to AUTO |

TABLE 3-continued

| Scene | Dimming Description |
|---|---|
| 14 | Respond to occupancy input |
| 15 | Do not respond to occupancy input |
| 16 | Enable light harvesting |
| 17 | Disable light harvesting |
| 18 | Enable maintain lux update by user via switch input |
| 19 | Disable maintain lux update by user via switch input |

Table 3 below lists the scenes and their descriptions related to the dimming (triac) capability of the control unit.

TABLE 4

| Scene | Dimming - Fixed Levels Description |
|---|---|
| 20 | Set lights to 10% brightness |
| 21 | Set lights to 20% brightness |
| 22 | Set lights to 25% brightness |
| 23 | Set lights to 30% brightness |
| 24 | Set lights to 40% brightness |
| 25 | Set lights to 50% brightness |
| 26 | Set lights to 60% brightness |
| 27 | Set lights to 70% brightness |
| 28 | Set lights to 75% brightness |
| 29 | Set lights to 80% brightness |
| 30 | Set lights to 90% brightness |
| 31 | Set lights to 100% brightness |

Table 3 below lists the scenes and their descriptions related to the 0 to 10 V control capability of the control unit.

TABLE 5

| Scene | 0 to 10 V Control Description |
|---|---|
| 32 | Lights off |
| 33 | Lights on |
| 34 | Set switch input to California Title 24 |
| 35 | Set switch input to mast Switch mode |
| 36 | Set switch input to AUTO |
| 37 | Respond to occupancy input |
| 38 | Do not respond to occupancy input |
| 39 | Enable light harvesting |
| 40 | Disable light harvesting |
| 41 | Enable maintain lux update by user via switch input |
| 42 | Disable maintain lux update by user via switch input |

Table 6 below lists the scenes and their descriptions related to the 0 to 10 V control capability of the control unit.

TABLE 6

| Scene | 0 to 10 V Control - Fixed Levels Description |
|---|---|
| 43 | Set lights to 10% brightness |
| 44 | Set lights to 20% brightness |
| 45 | Set lights to 25% brightness |
| 46 | Set lights to 30% brightness |
| 47 | Set lights to 40% brightness |
| 48 | Set lights to 50% brightness |
| 49 | Set lights to 60% brightness |
| 50 | Set lights to 70% brightness |
| 51 | Set lights to 75% brightness |
| 52 | Set lights to 80% brightness |

TABLE 6-continued 0 to 10 V Control - Fixed Levels

| Scene | Description |
|---|---|
| 53 | Set lights to 90% brightness |
| 54 | Set lights to 100% brightness |

Note that the scenes presented in the tables above are for illustrative purposes only, other scenes can be created in accordance with the user's needs.

Scheduler Inputs

The scheduler task 249 provides a user with the ability to set scene events which can either be used to control the operation of the control unit, to report to other control units and to affect the overall operation of individual devices as well as the system. An output of type Scene as described earlier can be facilitated to control other control units which do not incorporate scheduling functionality.

The scheduler task 249 requires a time/date/day setting entered manually by the user, by an external time of day sensor or automatically via means using an available atomic date/time. Schedules are adapted to contain the Event name, start/date/time duration and scene mode. A plurality of scheduled events can occur at any given time.

Low Voltage I/O

The low voltage I/O task 251 provides the user with the ability to select whether the associated I/O is going to be an input or output. This gives the user the flexibility to set or configure the I/O control during run-time as opposed to compile-time. The I/O can be used as a control mechanism whereby the actual data or signal may reside on other serial I/O pins for 0 to 10 VDC and 0 to 20 mA sensing/control. Other examples of low voltage inputs/outputs include: 0 to 24 mA, 100 ohm to 20 Kohm resistive and 0 to 10 V analog inputs, 0 to 30 VDC and dry contact digital inputs, 0 to 12 VDC 100 mA source and sink digital outputs, other non-protocol inputs/outputs, 0 to 10 V ballast, inputs from contact closures and outputs to a relay drive circuit.

Control Unit/Switch/Occupancy State Diagram

Figure 13A:
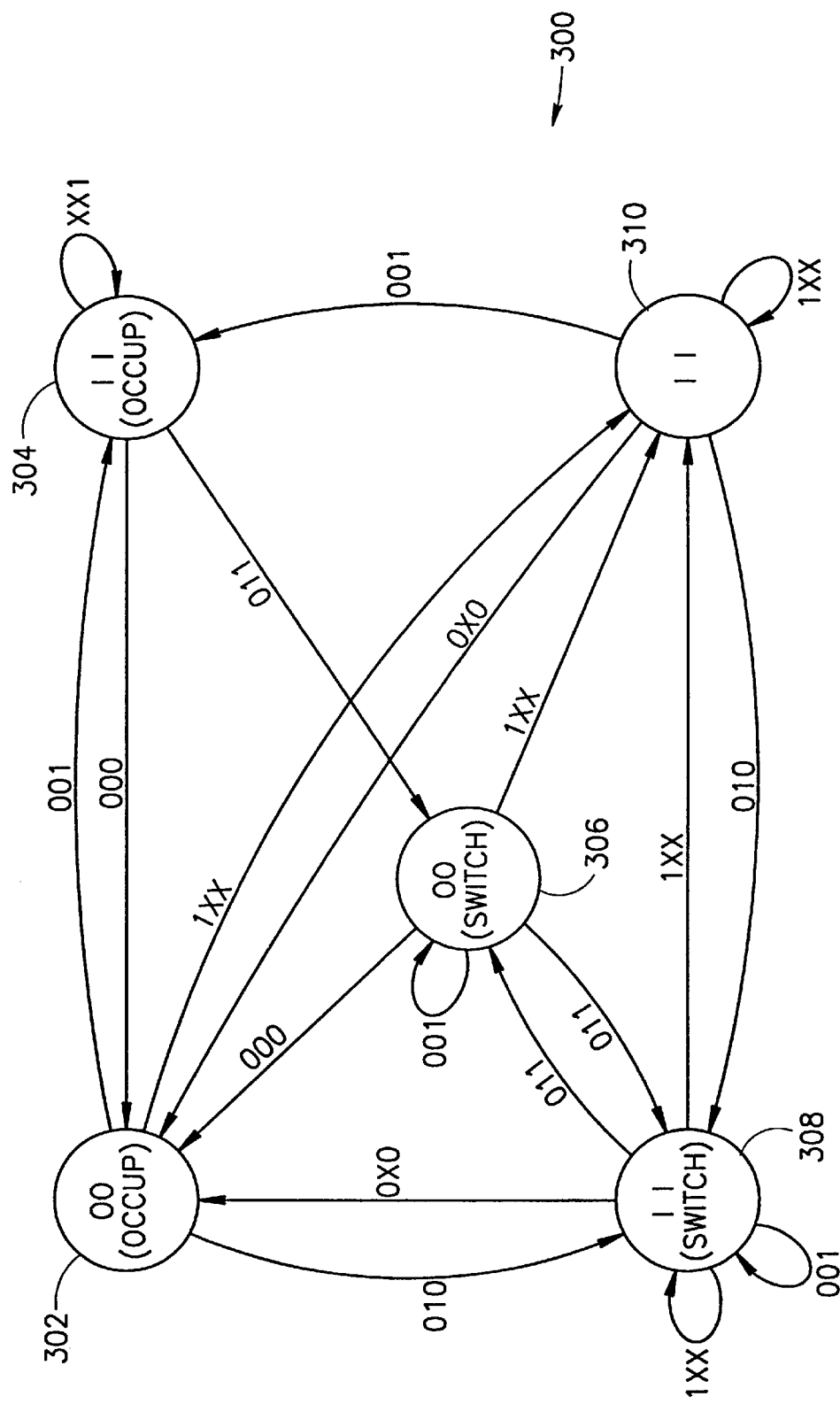
FIG. 13A is a state diagram illustrating the state transitions for a control unit connected to a load and coupled to an occupancy sensor and a switch.

A state diagram illustrating the state transitions for a control unit controlling power to a load and coupled via the network to an occupancy sensor and a switch is shown in FIG. 13A. A table illustrating the inputs and outputs of the state transition diagram shown in FIG. 13A is shown in FIG. 13B. The state diagram, generally referenced 300, comprises five states 302, 304, 306, 308 and 310. Two of the states are related to occupancy and two are related to a switch, i.e., from the switch or dimming sensor device. The states represent the state of the feedback signal and whether the load is on or off.

The state transitions each comprise three bits indicating the status of (1) occupancy (whether occupied or unoccupied) as detected by the occupancy sensor device, (2) switch (can be pressed or not pressed) as detected by the switch or dimming sensor device and (3) override (auto or on position) which is part of each sensor device. Note that when the selector switch is in the off position, the inhibit feature is triggered. Note also that an 'X' indicates that the transition occurs regardless of the state of that particular input. For example, when feedback is off and the load is off, turning on the override switch to on will turn the light on and cause feedback to turn on, regardless of the state of the occupancy and switch inputs.

As another example, assume the device is in state 302, i.e., the load is off and feedback is off. If the switch is pressed, the device transitions to the state 308 and the load and feedback turn on. If occupancy is detected, the device transitions to state 304, yielding similar results. If the auto/off/on switch is set to on, the device transitions to state 310 and the load and feedback turn on.

Dimmer Switch Unit

Figure 14:
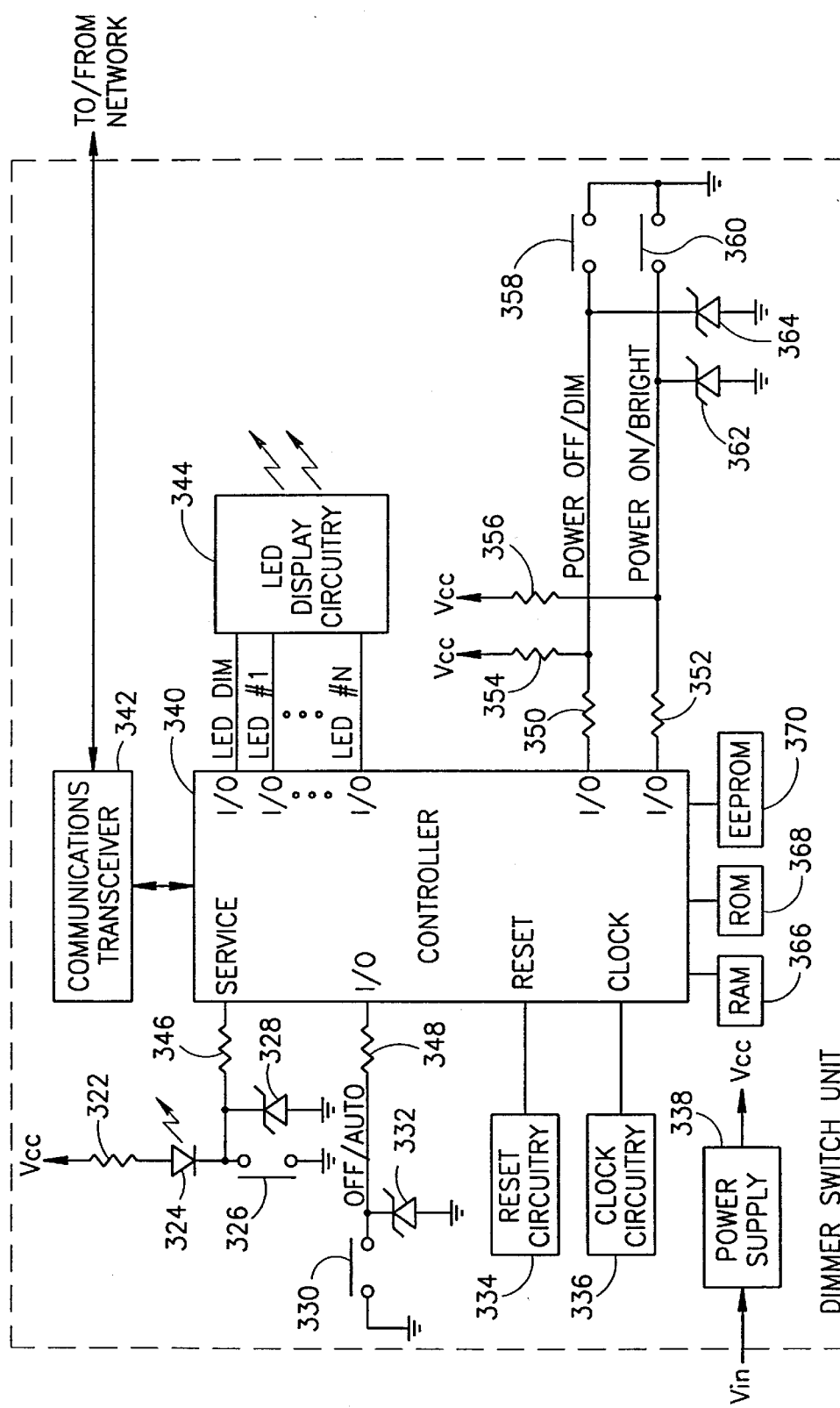
FIG. 14 as a block diagram illustrating the dimmer switch unit of the present invention.

A block diagram illustrating the dimmer switch unit of the present invention is shown in FIG. 14. The dimmer switch unit, generally referenced 320, is an example of another type of device that is part of the control network of the present invention described above. The unit 320 can be adapted to provide on/off control of a load in similar fashion to a conventional non-networked wall switch. In addition, it can be adapted to operate as a dimmer sensor device, providing brighten and dim control over a dimming load. The advantage of the dimmer/switch unit 320 of the present invention is that it is not hardwired to its associated electrical load. The unit has the capability of communicating over the network to other devices. Typically, the unit 320 would be bound (in LonWorks terminology) to a control unit 60 (FIG. 3) described previously. The commands generated by the dimmer/switch unit are received and interpreted by the tasks within the control unit with the load being effected accordingly.

The dimmer/switch unit 320 comprises a controller 340 at its core. The controller 340 functions similarly to the controller 90 in the control unit. Thus, a detailed description of the controller 340 will not be repeated here. The controller 340 comprises a service pin to which is connected a momentary push button switch 326 and service indicator 324 which may comprise an LED. The switch 326 is connected between ground and the cathode of the LED 324. The anode of the LED is connected to Vcc via resister 322. A zener diode 328 clamps the voltage on the service pin to a predetermined level. The switch 326 is connected to the service pin via a series resister 346. The service pin on the controller functions as both an input and an output. The controller 340 is adapted to detect the closure of the switch 326 and to perform service handling in response thereto.

The dimmer/switch unit 320 further comprises a switch 330 that determines the position of the OFF/AUTO input. The switch signal is input to an I/O port on the controller via resister 348. A zener diode 332 is connected between the signal and ground. This input controls the operation of the unit 320. If the switch is in the OFF state, the on/off or brighten/dim features of the device are disabled. If the switch is in the AUTO position, the device operates normally. Alternatively, the switch input can be adapted to provide a third position for an ON state. This switch position, forces the load to turn on regardless of the state of the on/off switch inputs. Generating a third position, however, requires additional hardware such as the addition of a second switch in addition to the switch 330 or the replacement of single throw switch 330 with a double throw switch. The controller can decode in software the signal output of the switch to yield the actual switch position.

The reset circuitry 334 functions similarly to that of reset circuitry 62 (FIG. 3). The clock circuitry 336 also functions similarly to the clock circuitry 64 (FIG. 3). The power supply 338 can be adapted to generate the required voltages, e.g., $V_{CC}$, 15 V, etc. directly from the phase and neutral. In the alternative, the power supply can be adapted to generate power from the 15 V output from the control unit. This simplifies the power supply circuitry that is required in the dimmer/switch unit.

Memory connected to the controller includes RAM 366, ROM 368 for firmware program storage and EEPROM 370 for storing downloadable software and various constants and parameters set and used by the device.

As described above, the dimmer/switch unit 320 interoperates with other devices on the network, particularly the control unit. The communication means within the device comprises a communication transceiver 342 that interfaces the controller 340 to the network. The communications transceiver 342 functions similarly to the communication transceiver 92 (FIG. 3) and may comprise any suitable communication/network interface means. The choice of network, e.g., LonWorks, CEBus, etc. in addition to the choice of media, determines the requirements for the communications transceiver 342. Using the LonWorks network as an example, the communications transceiver 342 may comprise the FTT-10A twisted pair transceiver manufactured by Echelon Corp. This transceiver comprises the necessary components to interface the controller to a twisted pair network. Transmit data from the controller 340 is input to the transceiver which functions to encode and process the data for placement onto the twisted pair cable. In addition, data received from the twisted pair wiring is processed and decoded and output to the controller 340. Transceivers for other types of media such as power line carrier, coaxial, optical fiber, etc. can also be used without departing from the spirit of the present invention.

The on/off and brighten/dim commands from a user are received by the controller 340 via circuitry comprising momentary switches 358, 360, zener diodes 362, 364 and resister 350, 352, 354, 356. The momentary contact type switches can be implemented on either end of a rocker type switch. The zener diodes limit the voltage input to the I/O ports on the controller. Both signals are pulled high to $V_{CC}$ by resisters 354, 356. Resisters 350, 352 limit the current into the I/O ports. The momentary switches can be used for both power on/off and brighten/dim control of a load. This option can be programmable within the controller and selected by external means or can be fixed within the controller.

The dimmer/switch unit 320 also comprises an LED display circuit 344 that functions to provide a user with a visual indication. The LED display circuit 344 is connected to a plurality of I/O ports on the controller via multiple signal lines.

In addition, non-protocol I/O devices can be attached to the unit 320 via one or more I/O lines into the controller 340. This permits non-protocol devices to be controlled and to share information among protocol enabled devices on the network.

Figure 15:
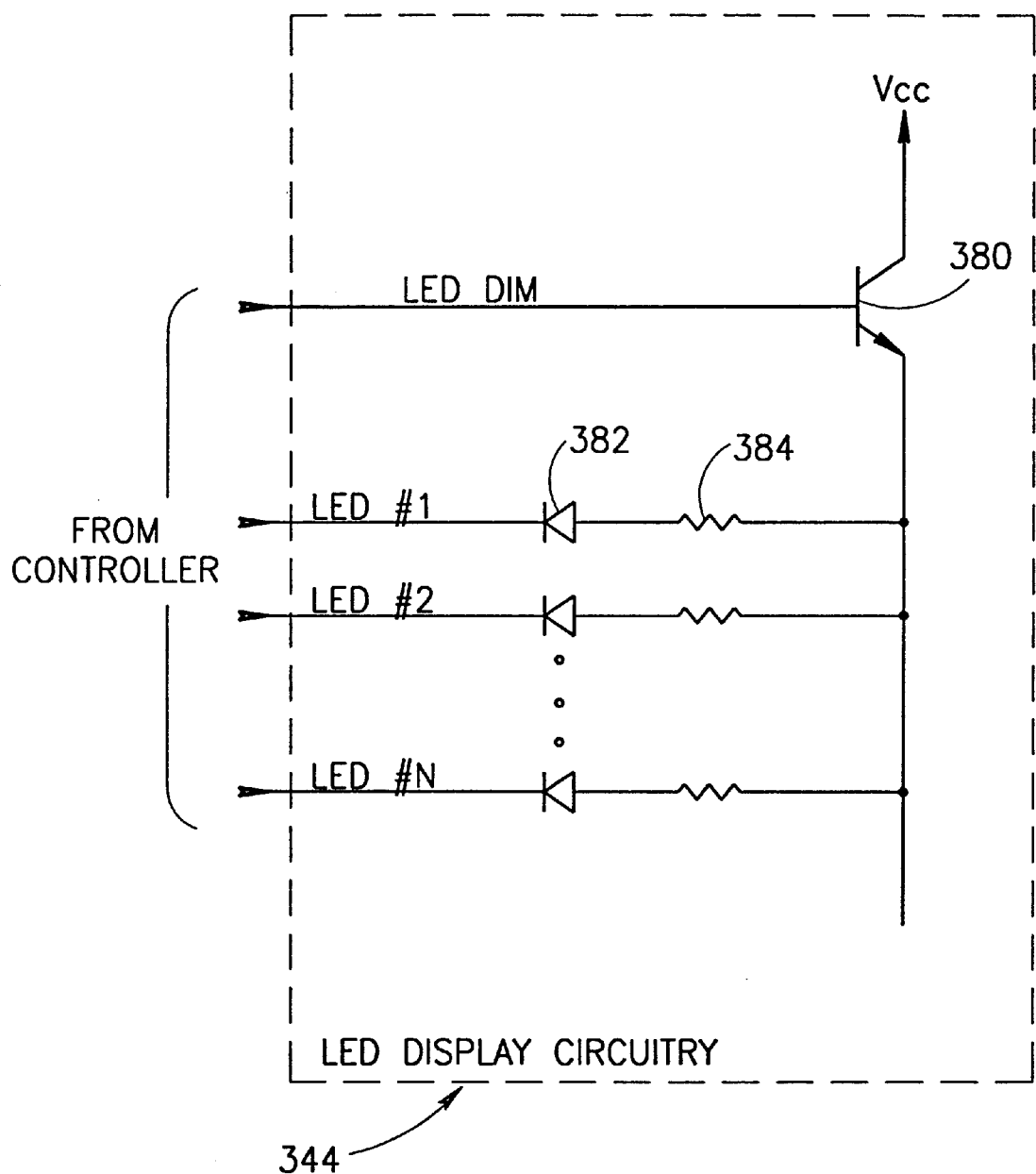
FIG. 15 is a schematic diagram illustrating the LED display circuitry of the dimmer switch unit in more detail.

A schematic diagram illustrating the LED display circuitry of the dimmer switch unit in more detail is shown in FIG. 15. The LED display circuitry comprises a plurality of LED elements 382. The cathode of each LED is connected to an I/O port on the controller via a signal line. The signal lines are labeled LED #1 through LED #N. Any number N of LEDs can be used to form an array or other suitable visual pattern. The anode of each LED is connected to the emitter of transistor 380. The collector of transistor 380 is connected to $V_{CC}$ and the base is connected to the controller via signal line LED_DIM. For an LED to be illuminated, the particular signal line LED must be active low while the transistor 380 is turned on. Thus, by individually controlling the LED signal lines, any combination or pattern of LEDs 382 can be illuminated.

In addition, it is possible to provide LED illuminate levels of other then simply on (100% brightness) and off (0% brightness). By varying the duty cycle of the LED_DIM signal, the LEDs to be illuminated can be set to different brightness levels. The controller functions to generate a pulse width modulated (PWM) LED_DIM signal which turns the LEDs 382 on and off at a rapid rate. By varying the percent on time of the PWM signal, the LEDs can be illuminated brighter or dimmer in accordance thereto.

The LED display circuitry 344 can be used in a variety of applications. One application is to display the dimming level that will be used the next time a 'turn on' command is received. This can be displayed when the lights are in the off state. In addition, the brightness level of the LEDs themselves can be dimmed to indicate that the lights are currently off. The LEDs can also be illuminated in a 'wave' type pattern so as to provide an illusion to the user that the light bar follows the actual lighting level being controlled. The 'wave' pattern is accomplished by illuminating the LEDs in a multiplexed fashion as well as allowing for one or more LEDs to be illuminated at a single time.

For instance, when going from an off state to an on state, the bottom LED illuminates to a 50% to 75% brightness level (which is adjustable) while the next LED is then illuminated. The process works in both the up and down mode and to full-off or full-on.

The software employs a pulse width modulation technique to achieve multiple light levels for each LED. Alternatively, a hardware switching ladder technique can be employed. The light bar is broken down into segments but could also be one continuous piece. Additionally, score marks could be employed in the continues light bar to provide for the illusion or appearance of a 'stepped' light bar response.

Another method utilizes a clear front rocker surface whereby the LEDs are underneath the surface and the rocker serves both as the user interface as well as the light pipe to show the state of the LEDs as described above.

Figure 16:
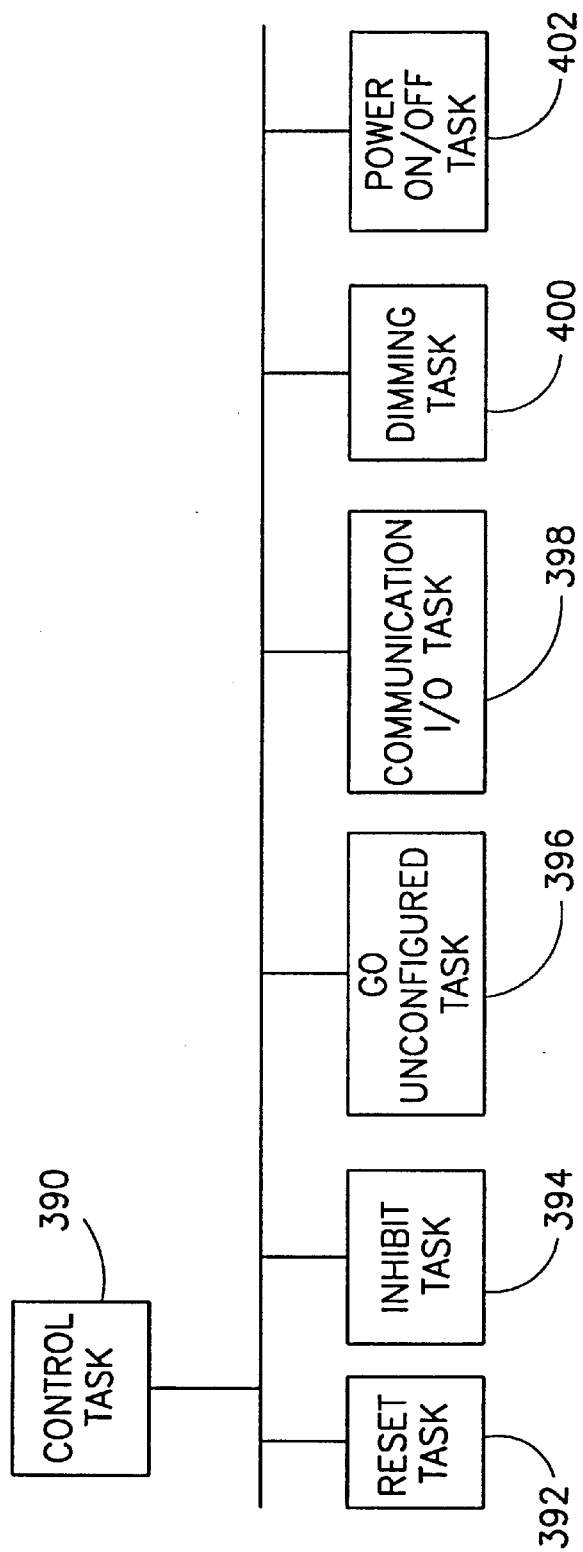
FIG. 16 is a block diagram illustrating the software portion of the dimmer control unit in more detail.

A block diagram illustrating the software portion of the dimmer control unit in more detail is shown in FIG. 16. The hardware and software components of the dimmer/switch unit in combination implement the functionality of the device. The software portion of the dimmer/switch unit will now be described in more detail. Note that the implementation of the software may be different depending on the type of controller used to construct the dimmer/switch unit. The functional tasks presented herein, however, can be implemented regardless of the actual controller and/or software methodology used. In the example presented herein, the controller comprises a Neuron 3120, 3150 processor or equivalent. Some of the functionality required to implement the dimmer/switch unit is incorporated into the device by the manufacturer. For example, the processing and associated firmware for implementing the physical, link and network layers of the communication stack are performed by means built into the Neuron processor. Thus, non-Neuron implementations of the dimmer/switch unit would require similar communication means to be able to share information with other devices over the network.

It is important to note that some of the tasks described herein may be event driven rather than part of a sequential program flow. The scope of the invention is not limited to any one particular implementation but is intended to encompass any realization of the functionality presented herein.

The various tasks described herein together implement the functionality of the dimmer/switch unit. Each of the tasks will now be described in more detail. The main control task 390 coordinates the operation of the dimmer/switch unit. The control task is responsible for the overall functioning of the dimmer/switch unit including initialization, housekeeping tasks, polling tasks, etc. In general, the dimmer/switch unit is adapted to respond to inputs generated local to the device itself and to commands received over the network from other devices. The control is effected by the use of network variables, in the case of LonWorks networks, for example. Thus, based on the values of the various network variables received, the dimmer/switch unit responds and behaves accordingly. The following describes the functionality provided by the dimmer/switch unit.

Reset Task

The reset task 392 functions to place the dimmer/switch into an initialization state. Variables are initialized, states of the various drivers are initialized, memory is cleared and the device begins executing its application code. The reset task executes at start up and at any other time it is called or the power is reset. The task functions to initialize the internal stack, service pin, internal state machines, external RAM, communication ports, timers and the scheduler. In addition, before the application code begins executing, the oscillators are given a chance to stabilize.

Inhibit Task

The inhibit task 394 provides the capability of inhibiting and overriding the normal operating mode of the dimmer/switch unit itself and other devices connected to the communications network. This task is intended to operate within an electrical network made up of a plurality of devices wherein a group of devices such as the dimmer/switch unit are capable of commanding a control device to disable electrical power from an electrical load. The devices or nodes communicate with the control device over the communications network. The inhibit mode is activated by a user placing the switch 330 in the OFF position. The inhibit task 394 functions similarly to the inhibit task 258 (FIG. 9) discussed in detail above. Thus, a detailed description will not be repeated here.

Go Unconfigured

The go unconfigured task 396 provides the capability of placing the dimmer/switch unit (also referred to as a node) in an unconfigured state. This is useful whenever the unit needs to be placed in a certain state such as the unconfigured state. A major advantage of this feature is that it provides an installer of LonWorks based systems the ability to easily place the electrical device (the node) in an unconfigured state utilizing the same button 326 that is used is make a service request. The dimmer/switch unit utilizes the service pin on the controller, e.g., Neuron chip, to place the node in an unconfigured state. Under control of the firmware built into the Neuron chip, the service pin is used during the configuration, installation and maintenance of the node embodying the Neuron chip. The go unconfigured task 396 functions similarly to the go unconfigured task 250 (FIG. 9) discussed in detail above. Thus, a detailed description will not be repeated here.

Communication I/O

The communication I/O task 398 functions in conjunction with the communication means located in the controller and the communication transceiver 342 connected to the controller 340. The controller itself comprises means for receiving and transmitting information over the network. The network variables are an example of the type of information communicated over the network. As described previously, the communications firmware for enabling communications over the network is built into the Neuron chip. Further details can be found in the Motorola Databook referenced above.

Dimming Task

The dimming task 400 implements the dimming functionality of the unit. A more detailed discussion of the dimming features of the system was presented above in connection with FIG. 11 and the dimming task 244 (FIG. 9). The dimming sensors 280 (FIG. 11) labeled #1 through #N may comprise the dimmer/switch unit 320. Each dimmer/switch unit is bound to the control unit via the network.

On each of the dimming sensors, the brightness level is adjusted by pressing a rocker switch which comprises the dim switch 358 and the brighten switch 360. Pressing up on the rocker switch increases the brightness level by an incremental amount, e.g., ½ or 1 full unit of resolution. When the rocker switch is pressed up, the controller detects the contact closure and a command is sent form the dimming sensor to the control unit that it is bound to. To dim the light, the switch is pressed in the down direction.

As was described previously, the dimmer/switch unit has a network variable bound to it from the control unit. The network variable comprises a feedback signal from the control unit to each dimmer/switch unit associated with a particular load connected to the control unit. The feedback signal keeps each dimmer/switch as to the state of the load. Thus, all the devices are kept informed with the current state of the load that may comprises the brightness level of the load among other quantities.

Power On/Off Task

The power on/off task 402 functions similarly to the dimming task, with the difference being that the load is turned off and on rather than dimmed and brightened. Similar to the case of dimming, the on/off control of a load also may include binding a feedback variable to all the dimmer/switch units bound to a particular load connected to the control unit.

Figure 17:
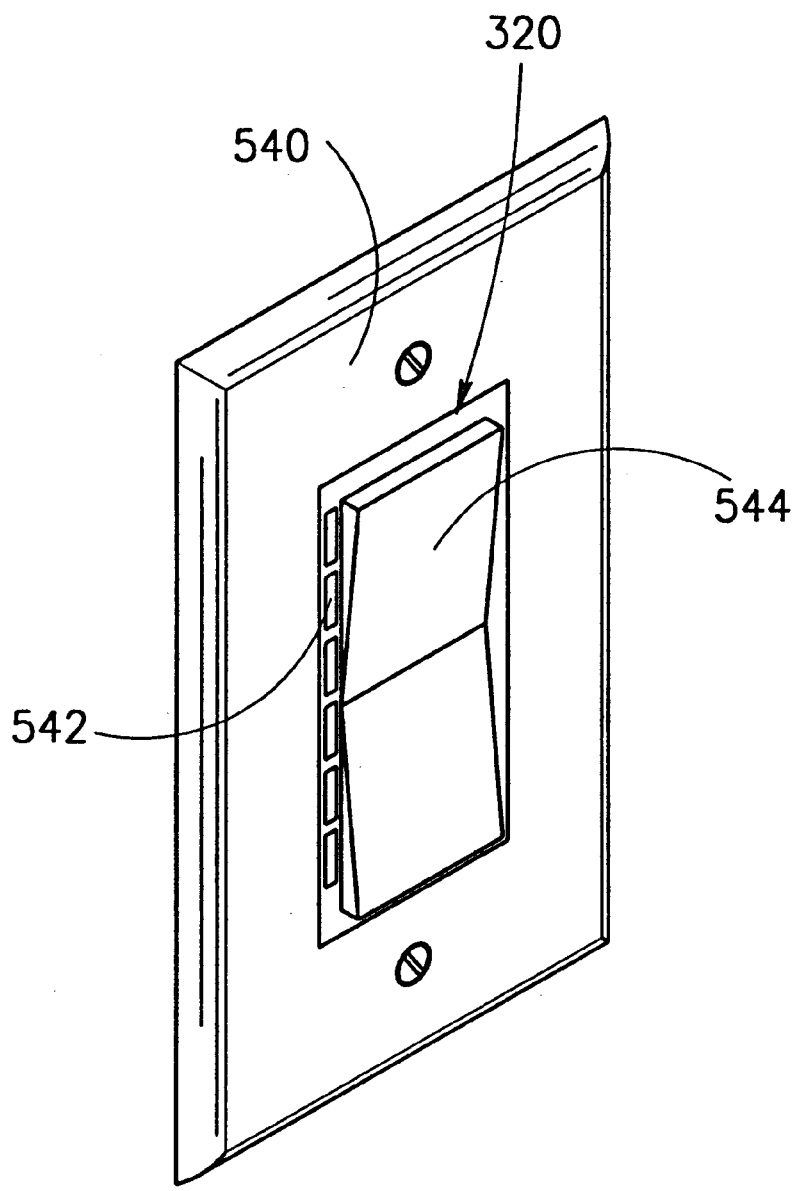
FIG. 17 is a diagram illustrating a dimmer/switch sensor unit suitable for use with the control system of the present invention.

A diagram illustrating a dimmer/switch sensor unit suitable for use with the control system of the present invention is shown in FIG. 17. The dimmer/switch sensor unit 320 is adapted to fit a single gang wall receptacle box. A Decora style cover plate 540 installs over the dimmer/switch sensor. The rocker 544 can be pressed in either the up or downward direction. Pressing the rocker 544 in the downward direction actuates switch 358 (FIG. 14). Pressing the rocker 544 in the upward direction actuates switch 360.

The LED display 542 provides a user with a visual indication as generated by the sensor 320. In this embodiment, six LED elements are arranged in a vertical line. If the sensor unit 320 is configured as a dimmer, the LEDs 542 can be used to indicate the brightness level of the load. Other arrangements and control schemes for the LEDs are also possible.

Occupancy/Ambient Light Sensor Unit

Figure 18:
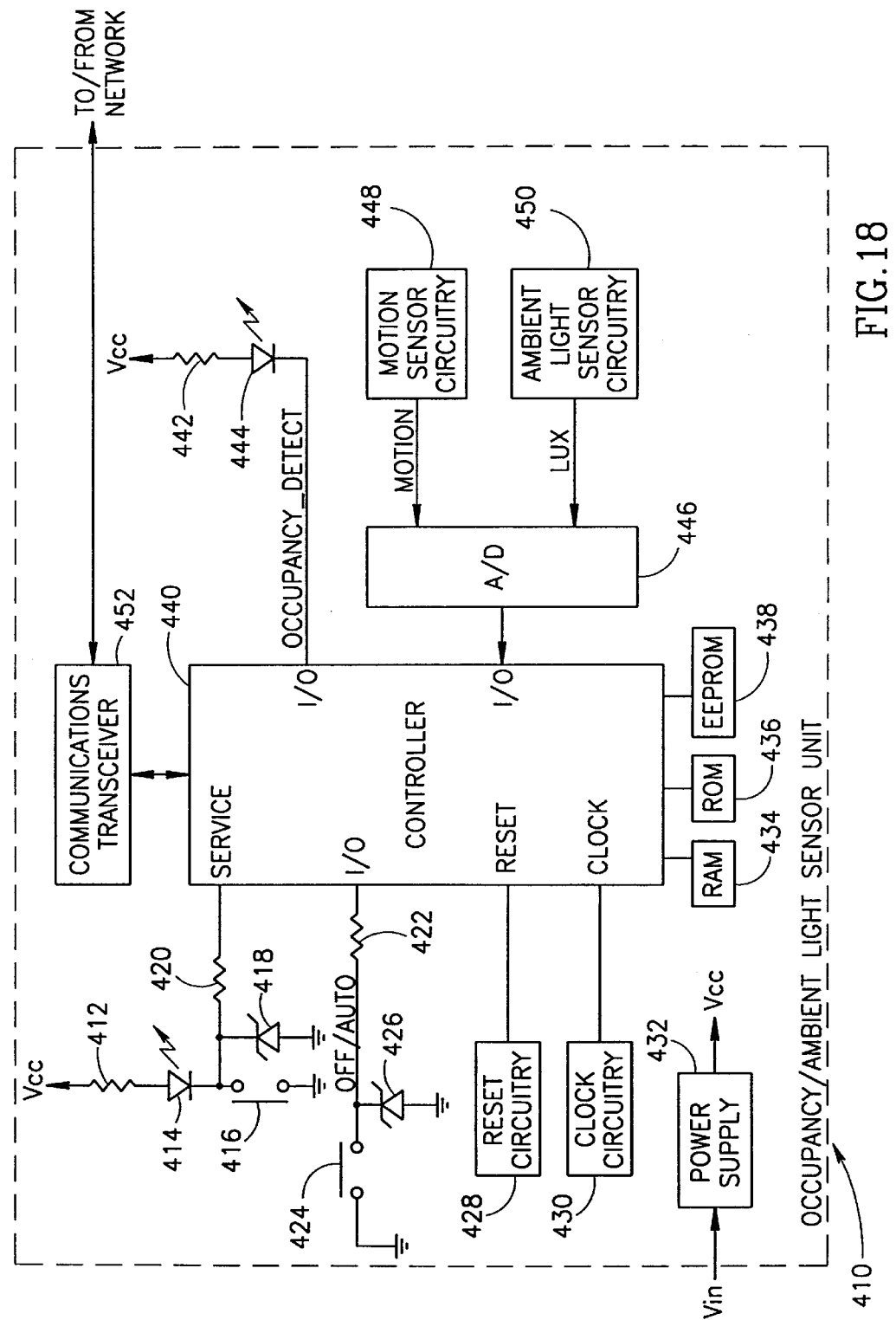
FIG. 18 is a block diagram of the occupancy/ambient light-sensing unit of the present invention.

A block diagram of the occupancy/ambient light-sensing unit of the present invention is shown in FIG. 18. The occupancy/ambient light sensing unit, generally referenced 410, is yet another example of the type of device that can be part of the control network of the present invention. The unit 410 is operative to detect motion within an area defined as the field of view of the unit. An advantage of the occupancy/ambient light sensing unit 410 of the present invention is that it is not hardwired to its associated electrical load. The unit has the capability of communicating over the network to other devices. Typically, the unit 410 would be bound to the control unit 60 (FIG. 3), described previously. The commands generated by the occupancy/ambient light sensing unit are received and interpreted by the tasks within the control unit with the load being effected accordingly.

The occupancy/ambient light sensing unit 410 comprises a controller 440 that functions similarly to the controller 90 in the control unit. Thus, a detailed description of the controller 440 will not be repeated here. The controller 440 comprises a service pin to which is connected a momentary push button switch 416 and service indicator 414 which may comprise an LED. The switch 416 is connected between ground and the cathode of the LED 414. The anode of the LED is connected to $V_{CC}$ via resister 412. A zener diode 418 clamps the voltage on the service pin to a predetermined level. The switch 416 is connected to the service pin via a series resister 420. The service pin on the controller functions as both an input and an output. The controller 440 is adapted to detect the closure of the switch 416 and to perform service handling in response thereto.

The occupancy/ambient light sensing unit 410 further comprises a switch 424 that determines the position of the OFF/AUTO input. The switch signal is input to an I/O port on the controller via resister 422. A zener diode 426 is connected between the signal and ground. This input controls the operation of the unit 410. If the switch is in the OFF state, the on/off or brighten/dim features of the device are disabled. If the switch is in the AUTO position, the device operates normally. Alternatively, the switch input can be adapted to provide a third position for an ON state. This switch position, forces the load to turn on regardless of the state of the on/off switch inputs. Generating a third position, however, requires additional hardware such as the addition of a second switch in addition to the switch 424 or the replacement of single throw switch 424 with a double throw switch. The controller can decode in software the signal output of the switch to yield the actual switch position.

The reset circuitry 428 functions similarly to that of reset circuitry 62 (FIG. 3). The clock circuitry 430 also functions similarly to the clock circuitry 64 (FIG. 3). The power supply 432 can be adapted to generate the required voltages, e.g., $V_{CC}$, 15 V, etc. directly from the phase and neutral. In the alternative, the power supply can be adapted to generate power from the 15 V output from the control unit. This simplifies the power supply circuitry that is required in the dimmer/switch unit.

Memory connected to the controller 440 includes RAM 434, ROM 436 for firmware program storage and EEPROM 438 for storing downloadable software and various constants and parameters set and used by the device.

As described above, the occupancy/ambient light sensing unit 410 interoperates with other devices on the network, particularly the control unit. The communication means within the device comprises a communication transceiver 452 that interfaces the controller 440 to the network. The communications transceiver 452 functions similarly to the communication transceiver 92 (FIG. 3) and may comprise any suitable communication/network interface means. The choice of network, e.g., LonWorks, CEBus, etc. in addition to the choice of media, determines the requirements for the communications transceiver 452. Using the LonWorks network as an example, the communications transceiver 452 may comprise the FTT-10A twisted pair transceiver manufactured by Echelon Corp, Palo Alto, Calif. This transceiver comprises the necessary components to interface the controller to a twisted pair network. Transmit data from the controller 440 is input to the transceiver which functions to encode and process the data for placement onto the twisted pair cable. In addition, data received from the twisted pair wiring is processed and decoded and output to the controller 440. Transceivers for other types of media such as power line carrier, coaxial, optical fiber, etc. can also be used without departing from the spirit of the present invention. Alternatively, the control unit functionality can be employed within the sensor devices themselves.

The occupancy/ambient light sensor unit 410 comprises both motion and light sensing portions. The motion sensor circuitry 448 generates an analog MOTION signal indicating the level of motion detected. An LED 444 functions to provide a user with a visual indication that the motion sensor circuitry has detected motion. The anode of the LED is connected to $V_{CC}$ via resistor 442. The cathode is connected to an I/O port via signal line OCCUPANCY_DETECT that is brought active low by the controller when the LED 44 is to be illuminated.

The ambient light sensing function is performed by ambient light sensor circuitry 450 which is adapted to generate an analog signal LUX representing the level of light measured by the sensor.

The two analog signals MOTION and LUX are input to a two channel A/D converter 446 which converts the analog input signals into a digital signal. The output of the A/D converter 446 is input to one of the I/O ports on the controller. The controller controls the A/D converter. Alternatively, the A/D conversion function may be incorporated into the controller as is common with many commercially available microcontrollers.

In addition, non-protocol I/O devices can be attached to the unit 410 via one or more I/O lines into the controller 440. This permits non-protocol devices to be controlled and to share information among protocol enabled devices on the network.

Figure 19:
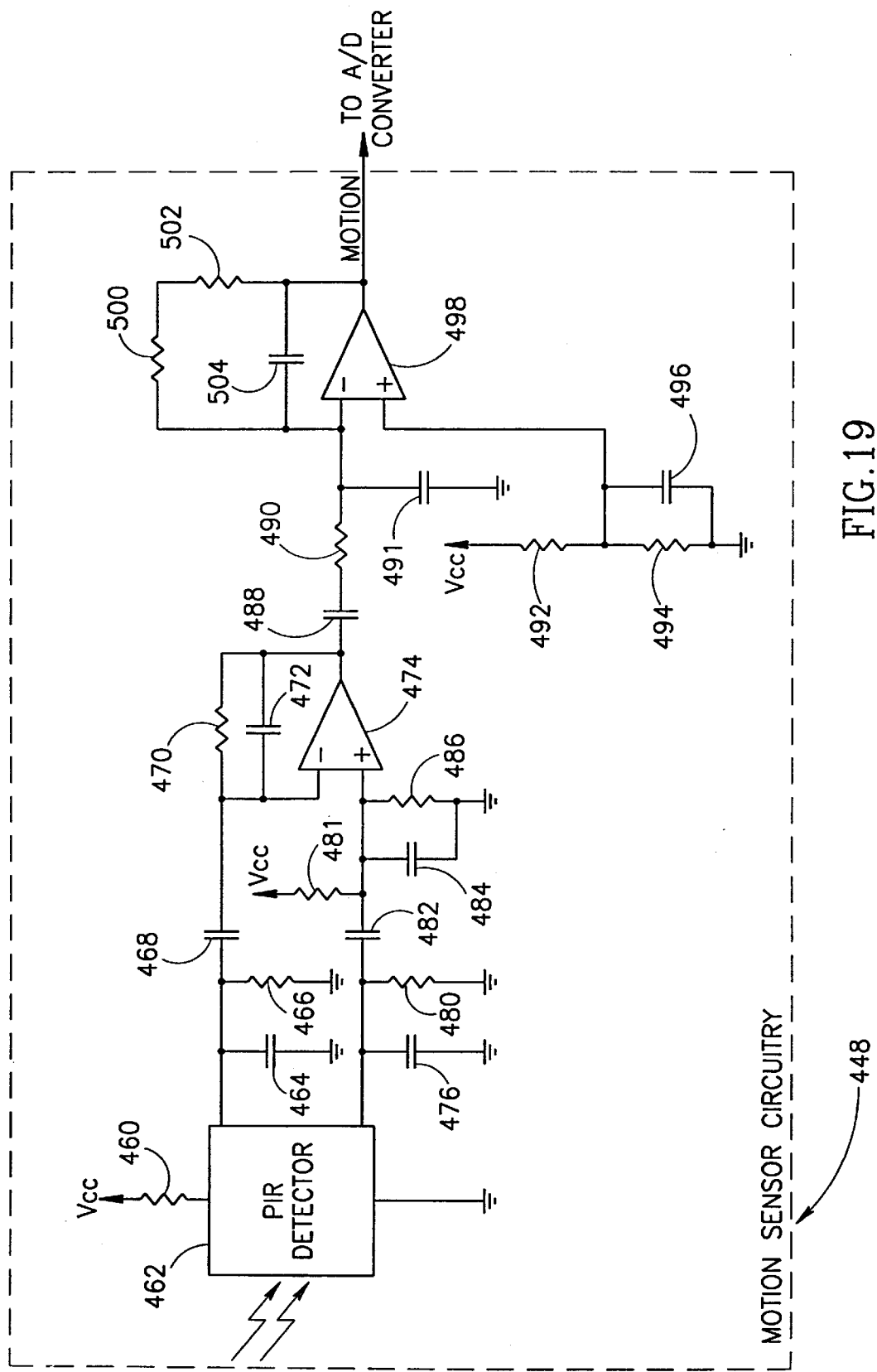
FIG. 19 is a schematic diagram illustrating the motion sensor circuitry portion of the occupancy/ambient light sensor unit in more detail.

A schematic diagram illustrating the motion sensor circuitry portion of the occupancy/ambient light sensor unit in more detail is shown in FIG. 19. The motion sensor circuitry 448 comprises a passive infrared (PIR) sensor 462 coupled between ground and $V_{CC}$ via resister 460. The PIR sensor may comprise a single sensor unit such as part number: LHI878 manufactured by Heimann or in the alternative a dual sensor unit. The signals output of the PIR sensor are processed by circuitry comprising capacitors 464, 476, 468, 482 and resisters 466, 480. The signal is then input to a signal conditioning operation amplifier (op amp) circuit comprising op amp 474, capacitors 472, 484 and resisters 470, 486. The non inverting input is pulled to $V_{CC}$ via resister 481.

The output of the op amp 474 is input to a second signal conditioning op amp circuit comprising op amp 498, capacitors 488, 491, 504, 496 and resisters 490, 492, 494, 500 and 502. The MOTION signal output of the op amp 498 is input to the A/D converter. The digital representation of the level of motion is processed by the occupancy task (described in more detail below) to determine whether or not the occupancy state should be declared.

Figure 20:
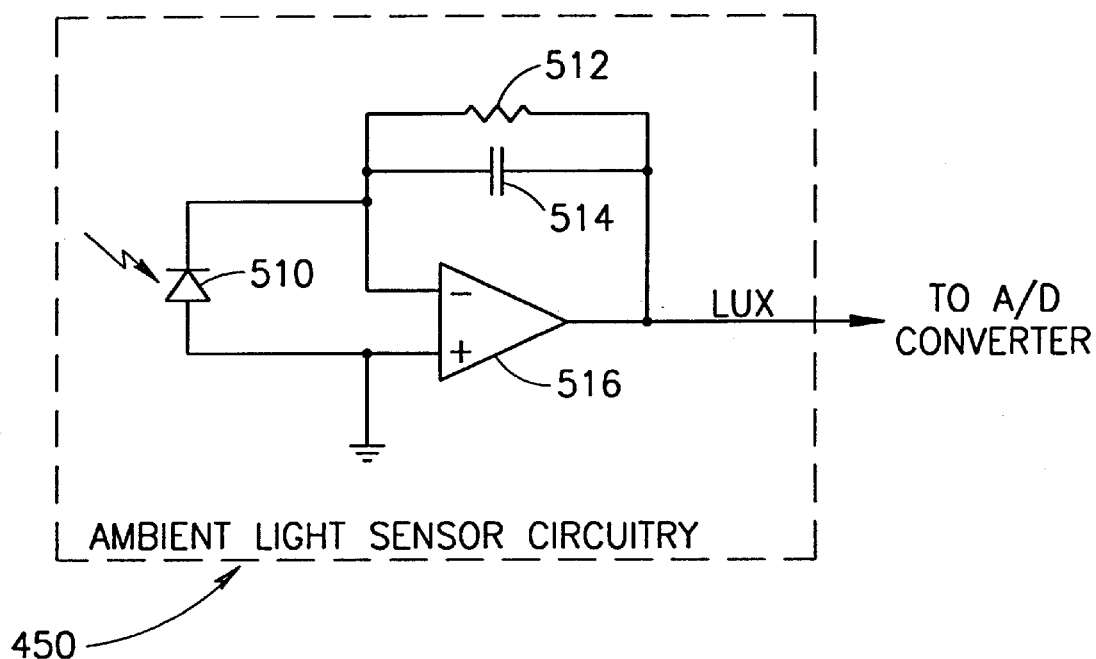
FIG. 20 is a schematic diagram illustrating the ambient light sensor circuitry portion of the occupancy/ambient light sensing unit in more detail.

A schematic diagram illustrating the ambient light sensor circuitry portion of the occupancy/ambient light sensing unit in more detail is shown in FIG. 20. The ambient light sensor circuitry 450 comprises an ambient light detector 510 such as part number S1087 manufactured by Hamamatsu. The cathode of the light detector 510 is connected to the inverting input of op amp 516. The anode of the detector 510 is connected to the ground and the non inverting input of the op amp 516. Capacitor 514 and resistor 512 are placed in the feedback path from the output to the inverting input. The LUX output of the op amp is input to one of the channels of the A/D converter. The digitized ambient light level is processed by the ambient light level task (described in more detail below) and transmitted as a network variable to all devices over the network that are bound to the device.

Figure 21:
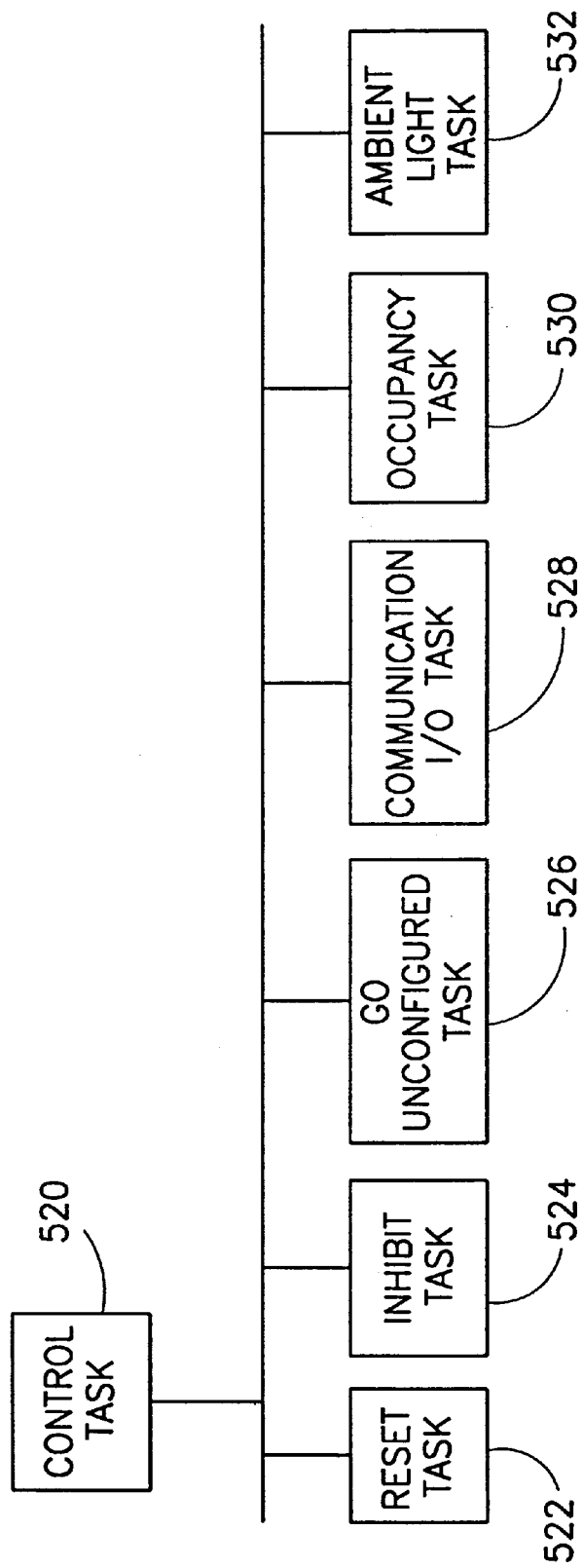
FIG. 21 is a block diagram illustrating the software portion of the occupancy/ambient light-sensing unit.

A block diagram illustrating the software portion of the occupancy/ambient light sensing unit is shown in FIG. 21. The hardware and software components of the occupancy/ambient light sensor unit in combination implement the functionality of the device. The software portion of the occupancy/ambient light sensor unit will now be described in more detail. Note that the implementation of the software may be different depending on the type of controller used to construct the occupancy/ambient light sensor unit. The functional tasks presented herein, however, can be implemented regardless of the actual controller and/or software methodology used. In the example presented herein, the controller comprises a Neuron 3120, 3150 processor or equivalent. Some of the functionality required to implement the dimmer/switch unit is incorporated into the device by the manufacturer. For example, the processing and associated firmware for implementing the physical, link and network layers of the communication stack are performed by means built into the Neuron processor. Thus, non Neuron implementations of the dimmer/switch unit would require similar communication means to be able to share information with other devices over the network.

Note that some of the tasks described herein may be event driven rather than part of a sequential program flow. The scope of the invention is not limited to any one particular implementation but is intended to encompass any realization of the functionality presented herein.

The various tasks described herein together implement the functionality of the occupancy/ambient light sensor unit. Each of the tasks will now be described in more detail. The main control task 520 coordinates the operation of the occupancy/ambient light sensor unit. The control task is responsible for the overall functioning of the occupancy/ambient light sensor unit including initialization, housekeeping tasks, polling tasks, etc. In general, the occupancy/ambient light sensor unit is adapted to respond to inputs generated local to the device itself and to commands received over the network from other devices. The control is effected by the use of network variables (SNVTs), in the case of LonWorks networks, for example. Thus, based on the values of the various network variables received, the occupancy/ambient light sensor unit responds and behaves accordingly. The following describes the functionality provided by the occupancy/ambient light sensor unit.

Reset

The reset task 522 functions to place the occupancy/ambient light sensor into an initialization state. Variables are initialized, states of the various drivers are initialized, memory is cleared and the device begins executing its application code. The reset task executes at start up and at any other time it is called or the power is reset. The task functions to initialize the internal stack, service pin, internal state machines, external RAM, communication ports, timers and the scheduler. In addition, before the application code begins executing, the oscillators are given a chance to stabilize.

Inhibit

The inhibit task 524 provides the capability of inhibiting and overriding the normal operating mode of the occupancy/ambient light sensor unit itself and other devices connected to the communications network. This task is intended to operate within an electrical network made up of a plurality of devices wherein a group of devices such as the occupancy/ambient light sensor unit are capable of commanding a control device to disable electrical power from an electrical load. The devices or nodes communicate with the control device over the communications network. The inhibit mode is activated by a user placing the 424 in the OFF position. The inhibit task 524 functions similarly to the inhibit task 258 (FIG. 9) discussed in detail above. Thus, a detailed description will not be repeated here.

Go Unconfigured

The go unconfigured task 526 provides the capability of placing the occupancy/ambient light sensor unit (also referred to as a node) in an unconfigured state. This is useful whenever the unit needs to be placed in a certain state such as the unconfigured state. A major advantage of this feature is that it provides an installer of LonWorks based systems the ability to easily place the electrical device (the node) in an unconfigured state utilizing the same button 416 that is used is make a service request. The occupancy/ambient light sensor unit utilizes the service pin on the controller, e.g., Neuron chip, to place the node in an unconfigured state. Under control of the firmware built into the Neuron chip, the service pin is used during the configuration, installation and maintenance of the node embodying the Neuron chip. The go unconfigured task 526 functions similarly to the go unconfigured task 250 (FIG. 9) discussed in detail above. Thus, a detailed description will not be repeated here.

Communication I/O

The communication I/O task 528 functions in conjunction with the communication means located in the controller and the communication transceiver 452 connected to the controller 440. The controller itself comprises means for receiving and transmitting information over the network. The network variables, e.g., SNVTs, are an example of the type of information communicated over the network. As described previously, the communications firmware for enabling communications over the network is built into the Neuron chip. Further details can be found in the Motorola Databook referenced above.

Occupancy

The occupancy task 530 is used to detect occupancy and maintain the occupied state until no occupancy is detected. The occupancy task 530 implements the occupancy functionality of the unit. A more detailed discussion of the occupancy features of the system was presented above in connection with FIG. 10 and the occupancy task 256 (FIG. 9). The occupancy task is used in conjunction with the digitized OCCUPANCY signal output of the motion sensor circuitry 448 (FIG. 19). The occupancy feature can be used to detect occupancy in a room or an area. Typically, the output generated by the occupancy task is bound to the control unit, which controls electrical power to the load. The occupancy task performs the motion detection function and calculates application delay and/or hold times as required. Note that more than one occupancy sensor may be bound to the same load. In addition, the SNVT 'SNVT_occupancy' can be used in implementing the occupancy detection and reporting functions.

Along with the basic detection of motion, the occupancy task can utilize one or more configuration parameters that function to control the detection and reporting operations. In particular, a hold time parameter, e.g., SNVT_time_sec nciHoldTime, can be set which delays the reporting of a change from the occupied to unoccupied state. Note that preferably the occupancy sensor changes from the unoccupied state to the occupied state rapidly, but changes from the occupied to the unoccupied states after a delay. The purpose of the delay is to avoid unnecessary network traffic when the occupancy sensor is not detecting motion continuously. This is particularly useful when PIR detector are employed in the sensor unit.

Ambient Light

The ambient light task 532 functions to measure the ambient light level and output the corresponding lux value. The ambient light task 532 implements the ambient light functionality of the unit utilizing the LUX output of the ambient light sensor circuitry 450 (FIG. 20). A more detailed discussion of the ambient light features of the system was presented above in connection with FIG. 10 and the occupancy task 256 (FIG. 9).

One application of the ambient light feature is to maintain a particular lux level within an area. The ambient light task 532 receives light level data from the ambient light sensor and transmit the lux readings to device bound to it over the network.

1. The standard network variable SNVT_lux can be employed in the implementation of the ambient light task. In addition to the basic lux light level output, the light sensor object may input one or more parameters. In particular, the parameters may include the following: location (nciLocation)—physical location of the light sensor.
2. reflection factor (nciReflection)—used to adjust the internal gain factor for the measured illumination level; this may be necessary because the amount of light reflected back to the sensor element from the surface might be different.
3. field calibration (nciFieldCalibr)—used by the light sensor to self calibrate the sensor circuitry; the ambient light value measured with no external lux meter is used as input to the light sensor which then adjusts its reflection factor is yield the same output value.
4. Minimum send time (nciMinSendT)—used to control the minimum period between network variable transmissions, i.e., the maximum transmission rate.
5. Maximum send time (nciMaxSendT)—used to control the maximum period of time that expires before the current lux level is transmitted; this provides a heartbeat output that can be used by bound objects to ensure that the light sensor is still functioning properly.
6. Send on delta (nciMinDelta)—used to determine the amount by which the value obtained by the ambient light sensor circuitry must change before the lux level is transmitted.

Note that these parameters are optional and may or may not be used in any particular implementation of the ambient light task.

Figure 22A:
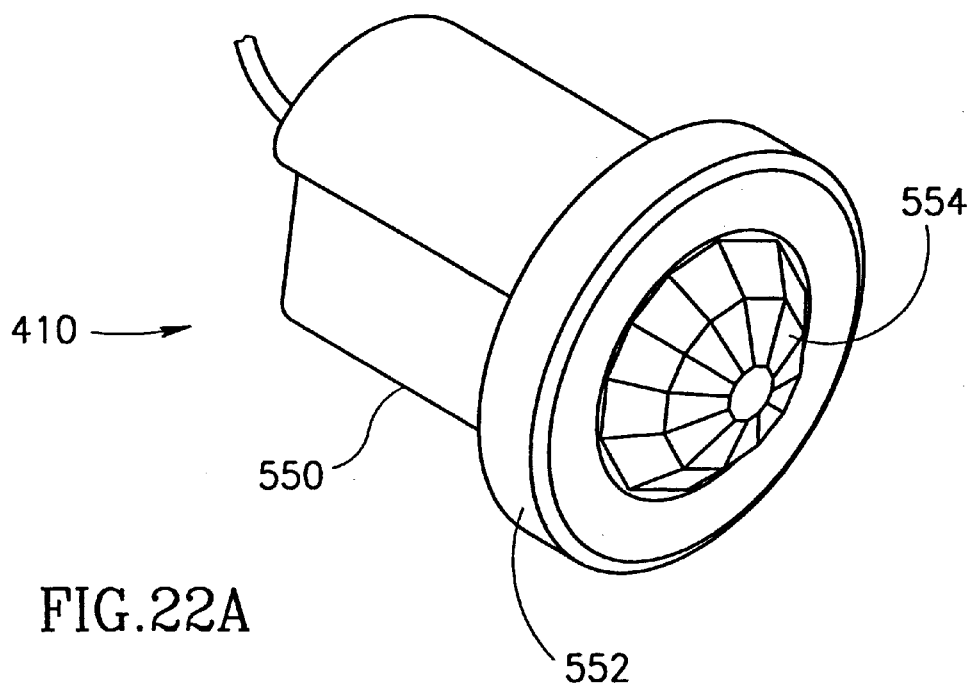
FIGS. 22A and 22B are perspective and side views, respectively, of an occupancy/ambient light sensor unit suitable for use with the present invention.
Figure 22B:
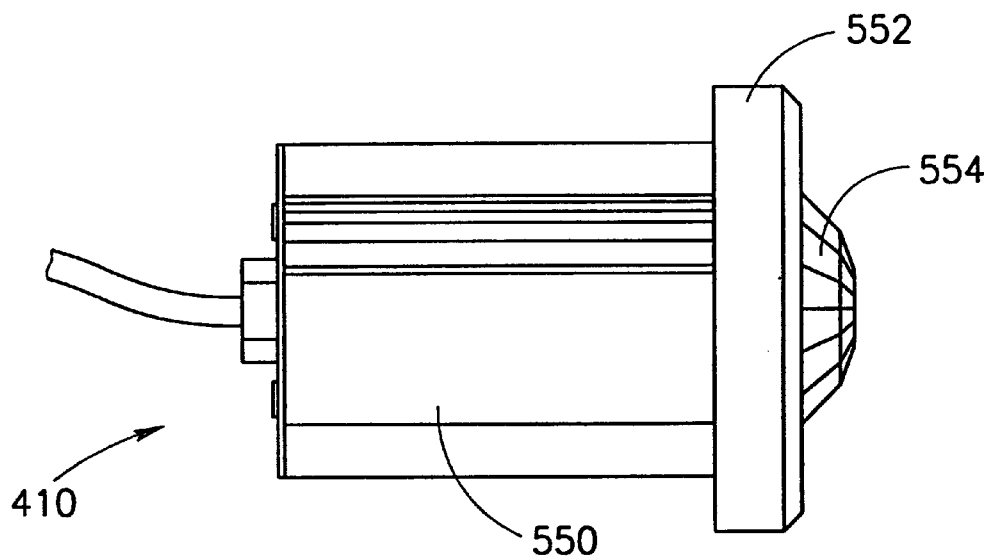

Perspective and side views, respectively, of an occupancy/ambient light sensor unit suitable for use with the present invention are shown in FIGS. 22A and 22B. The occupancy/ambient light sensor 410 comprises a case 550, mounting flange 552 and a lens 554 and is intended to be installed in a ceiling. Both the occupancy sensor element and the ambient light detector are located behind the lens. In another embodiment, the sensor 410 can be adapted to be mounted on a wall.

While the invention has been described with respect to a limited number of embodiments, it will be appreciated that many variations, modifications and other applications of the invention may be made.

What is claimed is:

1. A local operating network, comprising:
a communications network for sharing information; and
a plurality of electrical devices operatively connected to said communications network, each electrical device adapted to perform a first function,
wherein function-specific information is generated by a first electrical device having the associated first function,
wherein such function-specific information is transmitted to the plurality of electrical devices over the communications network, and
wherein such function-specific information is received by a second electrical device adapted to detect such function-specific information over the communications network and to respond to such function-specific information to perform a second function associated with the first function; and
wherein said communications network and said plurality of electrical devices operate in combination to distribute device functionality and share information thus forming a local operating network.

2. The local operating network according to claim 1, wherein said electrical device comprises a sensor device sensitive to and operative to measure physical stimuli, said sensor device is operative to communicate a quantity representing said measured physical stimuli over said communications network.

3. The local operating network according to claim 1, wherein said electrical device comprises a switch device adapted to include at least one electrical switch means operable by a user for turning electrical power to a load on and off, said switch device operative to communicate the actions of said user over said communications network.

4. The local operating network according to claim 1, wherein said electrical device comprises a dimming device adapted to include at least one electrical switch means operable by a user for brightening and dimming an electrical lighting load, said dimming device operative to communicate the actions of said user over said communications network.

5. The local operating network according to claim 1, wherein said electrical device comprises a control unit adapted to control an electrical load in accordance with information received over said communications network from one or more said electrical devices.

6. The local operating network according to claim 5, wherein said control unit comprises relay control means for controlling electrical power in on/off fashion to a relay load electrical coupled to said control unit.

7. The local operating network according to claim 5, wherein said control unit comprises dimming control means adapted to brighten and dim a dimming load electrically coupled to said control unit.

8. The local operating network according to claim 5, wherein said control unit comprises ballast control means adapted to generate a 0 to 10 volt light level control signal for brightening and dimming a fluorescent electronic ballast electrically coupled to said control unit.

9. The local operating network according to claim 5, wherein said control unit comprises motor control means for controlling electrical power to a motor load coupled to said control unit.

10. The local operating network according to claim 5, wherein said control unit comprises low voltage analog control means operative to generate a 0 to 10 volt analog signal for input to an analog load coupled to said control unit.

11. The local operating network according to claim 5, wherein said control unit comprises interface means for interfacing said control unit to non-protocol devices.

12. The local operating network according to claim 1, wherein one or more of said electrical devices comprises relay software application code for controlling the on/off state of one or more relays connected to said electrical device.

13. The local operating network according to claim 1, wherein one or more of said electrical devices comprises occupancy software application code for controlling an electrical load in accordance with the detection of motion in an area.

14. The local operating network according to claim 1, wherein one or more of said electrical devices comprises lumens maintenance software application code for driving a dimming output level to less than maximum to yield a reduction in energy consumption.

15. The local operating network according to claim 1, wherein one or more of said electrical devices comprises dimming software application code for providing dimming and brightening control of a dimming load.

16. The local operating network according to claim 1, wherein one or more of said electrical devices comprises California Title 24 software application code for modifying relay and dimming functionality in accordance with the statute thereof.

17. The local operating network according to claim 1, wherein one or more of said electrical devices comprises ambient light level software application code for maintaining a particular light level within an area.

18. The local operating network according to claim 17, wherein one or more of said electrical devices comprises light harvesting software application code for maintaining the light level by dimming or brightening the lighting load.

19. The local operating network according to claim 5, wherein one or more of said electrical devices comprises ballast software application code for controlling the light level of a plurality of fluorescent lights connected to said control unit.

20. The local operating network according to claim 1, wherein one or more of said electrical devices comprises low voltage analog occupancy software application code for generating a low voltage analog signal output to an analog load.

21. The local operating network according to claim 5, wherein one or more of said electrical devices comprises reset software application code for placing said control unit into an initialization state.

22. The local operating network according to claim 5, wherein one or more of said electrical devices comprises go unconfigured software application code for placing said control unit in an unconfigured state.

23. The local operating network according to claim 1, wherein one or more of said electrical devices comprises communication input/output (I/O) software application code for receiving data from and/or transmitting data to said communications network.

24. The local operating network according to claim 1, wherein one or more of said electrical devices comprises inhibit software application code for inhibiting and overriding the normal operating mode of said electrical device.

25. The local operating network according to claim 1, wherein one or more of said electrical devices comprises scene mode software application code for providing a user with a plurality of scenes into which said electrical device can be placed via a command transmitted over said communications network.

26. The local operating network according to claim 5, wherein one or more of said electrical devices comprises scheduler software application code for providing a user with the ability to set scene events for controlling the operating of said control unit.

27. The local operating network according to claim 5,
wherein the control unit includes pin means; and
wherein one or more of said electrical devices comprises low voltage input/output (I/O) software application code for providing the user the ability to set whether the pin means of the control unit functions as an input or an output.

28. The local operating network according to claim 1, wherein said communications network comprises twisted pair wiring.

29. The local operating network according to claim 1, wherein said communications network comprises radio frequency (RF) communications.

30. The local operating network according to claim 1, wherein said communications network comprises infrared communications.

31. The local operating network according to claim 1, wherein said communications network comprises optical communication over optical fiber.

32. The local operating network according to claim 1, wherein said communications network comprises power line carrier communications.

33. The local operating network according to claim 1, wherein said communications network comprises coaxial communications.

34. A control unit for use in a local operating network, said control unit comprising:
load control means adapted to control electrical power to a load electrically connected to said control unit;
a communications transceiver for transmitting and receiving data between said control unit and said local operating network, with the local operating network including:
a communications network; and
a plurality of electrical devices operatively connected to the communications network, each electrical device adapted to perform a first function,
wherein function-specific information is generated by a first electrical device having the associated first function,
wherein such function-specific information is transmitted to the plurality of electrical devices over the communications network, and
wherein such function-specific information is received by a second electrical device adapted to detect such function-specific information over the communications network and to respond to such function-specific information to perform a second function associated with the first function;

memory means for storing software application code;

a controller adapted to execute one or more software applications stored in said memory means, said controller, in combination with said one or more software applications, operative to receive the function-specific information over said local operating network from one or more electrical devices and to control said load control means in accordance thereto, said controller also operative to transmit the function-specific information over said local operating network to one or more electrical devices;

power supply circuitry electrically coupled to a source of electrical power, said power supply circuitry adapted to generate one or more voltages for use by said control unit and an output voltage for use by a plurality of external electrical devices.

35. The control unit according to claim 34, wherein said load control means comprises ballast dimming circuitry operative to provide a 0 to 10 V signal suitable for use by an electronic ballast electrically connected thereto.

36. The control unit according to claim 34, wherein said load control means comprises relay driver circuitry operative to turn an electrical relay on and off, said relay electrically connected to a relay load.

37. The control unit according to claim 34, wherein said load control means comprises dimming circuitry operative to brighten and dim a lighting load electrically connected thereto.

38. The control unit according to claim 34, wherein said load control means comprises motor drive circuitry operative to control an electrical motor.

39. The control unit according to claim 34, wherein said load control means comprises low voltage analog drive circuitry operative to provide an analog low voltage signal for use by an analog load electrically connected to said control unit.

40. The control unit according to claim 34, further comprising input/output (I/O) means for interfacing said control unit to one or more non-protocol devices.

41. The control unit according to claim 34, wherein said one or more software applications comprises relay software application code for controlling the on/off state of one or more relays connected to said control unit.

42. The control unit according to claim 34, wherein said one or more software applications comprises occupancy software application code for controlling an electrical load in accordance with the detection of motion in an area.

43. The control unit according to claim 34, wherein said one or more software applications comprises lumens maintenance software application code for driving a dimming output level to less than maximum to yield a reduction in energy consumption.

44. The control unit according to claim 34, wherein said one or more software applications comprises dimming software application code for providing dimming and brightening control of a dimming load.

45. The control unit according to claim 34, wherein said one or more software applications comprises California Title 24 software application code for modifying relay and dimming functionality in accordance with the statute thereof.

46. The control unit according to claim 34, wherein said one or more software applications comprises ambient light level software application code for maintaining a particular light level within an area.

47. The control unit according to claim 46, wherein said one or more software applications comprises light harvesting software application code for maintaining the light level by dimming or brightening the lighting load.

48. The control unit according to claim 34, wherein said one or more software applications comprises ballast software application code for controlling the light level of fluorescent lights connected to said control unit.

49. The control unit according to claim 34, wherein said one or more software applications comprises low voltage analog occupancy software application code for generating a low voltage analog signal output to an analog load.

50. The control unit according to claim 34, wherein said one or more software applications comprises reset software application code for placing said control unit into an initialization state.

51. The control unit according to claim 34, wherein said one or more software applications comprises go unconfigured software application code for placing said control unit in an unconfigured state.

52. The control unit according to claim 34, wherein said one or more software applications comprises communication input/output (I/O) software application code for receiving data from and/or transmitting data to said communications network.

53. The control unit according to claim 34, wherein said one or more software applications comprises inhibit software application code for inhibiting and overriding the normal operating mode of said control unit.

54. The control unit according to claim 34, wherein said one or more software applications comprises scene mode software application code for providing a user with a plurality of scenes into which said control unit can be placed via a command transmitted over said communications network.

55. The control unit according to claim 34, wherein said one or more software applications comprises scheduler software application code for providing a user with the ability to set scene events for controlling the operating of said control unit.

56. The control unit according to claim 34,
wherein the controller includes pin means; and
wherein said one or more software applications comprises low voltage input/output (I/O) software application code for providing the user the ability to set whether the pin means on said controller functions as an input or an output.

57. The control unit according to claim 37, wherein said dimming circuitry comprises:
a triac circuit adapted to receive a dimming signal representing the desired light level, said triac circuit adapted to brighten or dim said lighting load in response to said dimming signal;
a relay connected in series with said triac circuit, said relay operative to provide an air gap so as to disconnect electrical power from said dimming load; and
zero detect circuitry electrically coupled to said source of electrical power, said zero detect circuitry operative to detect the zero crossings of said electrical power and generate a signal in accordance thereto.

58. The control unit according to claim 34, wherein said memory means comprises random access memory (RAM).

59. The control unit according to claim 34, wherein said memory means comprises read only memory (ROM).

60. The control unit according to claim 34, wherein said memory means comprises electrically erasable programmable read only memory (EEPROM).

61. The control unit according to claim 34, wherein said communications transceiver comprises a twisted pair wiring transceiver.

62. The control unit according to claim 34, wherein said communications transceiver comprises a radio frequency (RF) transceiver.

63. The control unit according to claim 34, wherein said communications transceiver comprises a power line carrier transceiver.

64. The control unit according to claim 34, wherein said communications transceiver comprises an infrared (IR) transceiver.

65. The control unit according to claim 34, wherein said communications transceiver comprises an optical fiber transceiver.

66. The control unit according to claim 34, wherein said communications transceiver comprises a coaxial cable transceiver.

67. The control unit according to claim 34, wherein said communications transceiver comprises a twisted pair wiring transceiver.

68. The control unit according to claim 34, wherein said controller comprises an integrated circuit.

69. The control unit according to claim 34, wherein said controller comprises a a microcontroller including an integrated circuit.

\* \* \* \* \*